(12) United States Patent
Ishii

(10) Patent No.: US 8,208,752 B2
(45) Date of Patent: Jun. 26, 2012

(54) IMAGE PROCESSING APPARATUS, CONTROL METHOD THEREFOR, PROGRAM, STORAGE MEDIUM, AND IMAGE CAPTURING APPARATUS

(75) Inventor: Masatoshi Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1124 days.

(21) Appl. No.: 12/039,402

(22) Filed: Feb. 28, 2008

(65) Prior Publication Data

US 2008/0240608 A1    Oct. 2, 2008

(30) Foreign Application Priority Data

Mar. 27, 2007    (JP) ................................ 2007-082743

(51) Int. Cl.
*G06K 9/40* (2006.01)
(52) U.S. Cl. ........................................ 382/275
(58) Field of Classification Search .................. 382/275
See application file for complete search history.

(56) References Cited

U.S. PATENT DOCUMENTS

| | | | |
|---|---|---|---|
| 6,791,608 B1 | 9/2004 | Miyazawa | |
| 7,206,461 B2 * | 4/2007 | Steinberg et al. | 382/274 |
| 7,308,156 B2 * | 12/2007 | Steinberg et al. | 382/294 |
| 7,310,450 B2 * | 12/2007 | Steinberg et al. | 382/275 |
| 7,315,658 B2 * | 1/2008 | Steinberg et al. | 382/275 |
| 7,340,109 B2 * | 3/2008 | Steinberg et al. | 382/275 |
| 7,369,712 B2 * | 5/2008 | Steinberg et al. | 382/275 |
| 7,424,170 B2 * | 9/2008 | Steinberg et al. | 382/275 |
| 7,536,060 B2 * | 5/2009 | Steinberg et al. | 382/274 |
| 7,536,061 B2 * | 5/2009 | Steinberg et al. | 382/275 |
| 7,545,995 B2 * | 6/2009 | Steinberg et al. | 382/275 |
| 7,990,458 B2 * | 8/2011 | Kanzaki et al. | 348/333.12 |
| 2003/0039402 A1 * | 2/2003 | Robins et al. | 382/275 |
| 2003/0039403 A1 * | 2/2003 | Robins | 382/275 |
| 2004/0027618 A1 * | 2/2004 | Nakamura et al. | 358/3.26 |
| 2005/0068447 A1 * | 3/2005 | Steinberg et al. | 348/335 |

FOREIGN PATENT DOCUMENTS

| | | |
|---|---|---|
| JP | 2001-223894 | 8/2001 |
| JP | 2004-222231 | 8/2004 |

OTHER PUBLICATIONS

The above reference was cited in a Dec. 4, 2009 Chinese Office Action a which is enclosed with English Translation, that issued in Chinese Patent Application No. 200810084831.6.

* cited by examiner

*Primary Examiner* — Bhavesh Mehta
*Assistant Examiner* — Sean Motsinger
(74) *Attorney, Agent, or Firm* — Cowan, Liebowitz & Latman, P.C.

(57) ABSTRACT

There is provided an image processing apparatus which corrects a shot image, which is shot by an image capturing apparatus and on which a shadow of a foreign substance existing on a shooting optical path of the image capturing apparatus is captured, so as to reduce an influence of the shadow of the foreign substance. The image processing apparatus includes a display unit which displays the shot image, a correction unit which corrects the shot image so as to reduce the influence of the shadow of the foreign substance on the basis of foreign substance information, an input unit which is used by a user to perform input operation in accordance with a shot image displayed on the display unit and inputs unregistered foreign substance information which has not been registered in foreign substance information, and an additional registration unit which additionally registers the unregistered foreign substance information.

9 Claims, 24 Drawing Sheets

FIG. 5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST AREAS |
| +0C | | PARAMETERS FOR DUST AREA $D_1$<br>RADIUS (TWO BYES)<br>x-COORDINATE OF CENTER (TWO BYTES)<br>y-COORDINATE OF CENTER (TWO BYTES) |
| | | PARAMETERS FOR DUST AREA $D_2$ |
| | | . . . |
| | | PARAMETERS FOR DUST AREA $D_n$ |

FIG. 15

| ADDRESS OFFSET (Hex) | CODE (Hex) | MEANING |
|---|---|---|
| +00 | | PROCESSING ID |
| +02 | | APPLICATION RANGE<br>　　RADIUS (TWO BYTES)<br>　　x-COORDINATE OF CENTER (TWO BYTES)<br>　　y-COORDINATE OF CENTER (TWO BYTES) |
| +08 | | RELATIVE POSITION FROM COPY SOURCE TO COPY DESTINATION<br>　　x DIRECTION (TWO BYTES)<br>　　y DIRECTION (TWO BYTES) |
| +06 | | POINTER TO DIFFERENCE IMAGE |

FIG. 21

| IMAGE INFORMATION | | | ADDITIONAL DUST CORRECTION DATA TABLE ID |
|---|---|---|---|
| SHOOTING DATE | MODEL ID | CAMERA TYPE | |
| 2006/8/31 | 1111111111 | DIGITAL CAMERA A | 0x0001 |
| 2006/8/31 | 2222222222 | DIGITAL CAMERA B | 0x0002 |
| 2006/9/15 | 3333333333 | DIGITAL CAMERA C | 0x0003 |
| | | | |
| | | | |
| | | | | ns
IMAGE PROCESSING APPARATUS, CONTROL METHOD THEREFOR, PROGRAM, STORAGE MEDIUM, AND IMAGE CAPTURING APPARATUS

BACKGROUND OF THE INVENTION

1. Field of the Invention

The present invention relates to a technique of suppressing the deterioration of image quality due to a foreign substance adhering to the surface of an optical low-pass filter or the like in an image capturing apparatus using an image sensor such as a CCD or CMOS sensor.

2. Description of the Related Art

Recently, many image capturing apparatuses have appeared on the market, which generate an image signal using an image sensor such as a CCD and records it as data, like digital cameras and digital video cameras. A digital camera eliminates the necessity of a photosensitive film, which has been conventionally used as a recording medium, and records an image as data on a data recording medium such as a semiconductor memory card or a hard disk drive instead of such a film. These data recording media allow repetitive write and erase operations unlike films, and hence can reduce the consumable expenditure. That is, such media are very useful.

In general, a digital camera is equipped with an LCD (Liquid Crystal Display) monitor capable of displaying shot images as needed and a detachable large-capacity storage device.

Using the digital camera comprising these two devices can eliminate the necessity of a film, which is a recording medium conventionally used as a consumable, and allows the user to immediately check a shot image on the spot by displaying it on the LCD monitor device. It is therefore possible to erase any unsatisfactory image data on the spot or perform re-shooting as needed. That is, as compared with silver halide cameras using films, digital cameras have remarkably improved the efficiency of shooting operation.

Owing to such convenience and technical innovation such as an increase in the resolution of image sensors, the application range of digital cameras has been expanded. Recently, there have been available many lens interchangeable digital cameras such as single-lens reflex cameras.

In a digital camera, however, a foreign substance such as dust or mote (to be simply referred to as dust hereinafter) sometimes adheres to an image sensor protective glass, the surface of an optical filter or the like, or an optical system which are placed on the shooting optical axis in front of an image sensor (which will be generically referred to as an image sensor optical component hereinafter). When dust adheres to an image sensor optical component in this manner, the dust blocks light. As a result, for example, the corresponding portion cannot be shot. That is, the quality of the shot image deteriorates.

In cameras using silver halide films as well as in digital cameras, dust on a film is also captured on an image. However, the film changes after every shot, and hence similar dust is very rarely captured on all frames.

In contrast, the image sensor of the digital camera does not move, and the camera performs shooting using the same image sensor. For this reason, once dust adheres to an image sensor optical component, the dust is captured on many frames (shot images) in the same manner. A lens interchangeable digital camera, in particular, has a problem that dust tends to enter the camera at the time of lens interchange.

The user of the camera therefore must always care about the adhesion of dust to an image sensor optical component, and spends much effort to check and clean dust. Since an image sensor, in particular, is placed relatively deep inside the camera, it is not easy to clean or check dust.

Dust easily enters a lens interchangeable digital camera when a lens is attached/detached. Furthermore, in many lens interchangeable digital cameras, a focal plane shutter is placed immediately before an image sensor, and hence dust easily adheres to an image sensor optical component.

Since such dust generally adheres onto a protective glass or an optical filter instead of the surface of an image sensor, the dust is imaged in different states depending on the aperture value of a shooting lens or the distance from the pupil of the shooting lens to the capturing plane. That is, as the aperture value approaches the open F-number, a shot image blurs, and hence even the adhesion of small dust has almost no influence on the image. In contrast, as the aperture value increases, such dust is clearly imaged, and hence affects the image.

There is known a method of making dust less noticeable by preparing in advance an image of only dust on an image sensor, which is obtained by shooting a white wall or the like while the lens is set at a large aperture value, and using the image in combination with a general shot image (see Japanese Patent Laid-Open No. 2004-222231). This method, however, is cumbersome because the user must always be conscious of the correspondence between the image shot for dust detection and shot images to be associated with it.

It is therefore conceivable to hold information indicating the position of dust, which is acquired by shooting a white wall or the like, and attaching the information indicating the position or size of dust to image data obtained by general shooting operation. For example, using a separately prepared image processing apparatus makes it possible to analyze the dust position on the shot data from the attached information of the position of dust and make the image of the dust less noticeable by interpolating the analyzed area with surrounding pixels.

It is however difficult to make all dust images captured on images less noticeable by such processing. This is because, when information indicating the position of dust is to be acquired by shooting a white wall using a digital camera, the camera sometimes fails to acquire the information indicating the position of dust due to the influence of limb darkening or the like. In this case, since the dust is not registered in the list of dust positions and sizes, it is impossible to make the dust less noticeable by analysis and interpolation processing using the above image processing apparatus.

In addition, the list of dust positions and sizes increases in size as the number of dust particles registered increases. There is some limitation on the number of dust particles which can be registered in the list. That is, if an infinite number of dust particles adhere to the image sensor, it is impossible to register all the dust particles in the list. In such a case as well, there is dust whose position or size cannot be registered in the list, it is impossible to make the dust which is not registered less noticeable using analysis and interpolation processing using the above image processing apparatus.

As described above, any dust which is not registered in the above dust list cannot be made less noticeable by image processing using the dust list. That is, the user needs to manually designate the position of such dust on a shot image by himself/herself and make the dust less noticeable by performing a repair process or the like. If, however, there are a plurality of shot images, the user needs to perform such a manual repair process for all the images. This greatly increases the workload on the user.

SUMMARY OF THE INVENTION

The present invention has been made in consideration of the above problem, and has as its object to efficiently suppress the influence of dust on a shot image even when the dust adheres to a protective glass, filter, or the like placed in front of an image sensor.

In order to solve the above problem and achieve the above object, according to a first aspect of the present invention, there is provided an image processing apparatus which corrects a shot image, which is shot by an image capturing apparatus and on which a shadow of a foreign substance existing on a shooting optical path of the image capturing apparatus is captured, so as to reduce an influence of the shadow of the foreign substance, the apparatus comprising a display unit which displays the shot image, a correction unit which corrects the shot image so as to reduce the influence of the shadow of the foreign substance on the basis of foreign substance information which is information associated with the shot image and concerning at least a position and size of the foreign substance existing on the shooting optical path of the image capturing apparatus, an input unit which is used by a user to input additional foreign substance information in accordance with the shot image displayed on the display unit, and an additional registration unit which additionally registers the additional foreign substance information input by the input unit in the foreign substance information when the additional foreign substance information is unregistered foreign substance information.

According to a second aspect of the present invention, there is provided an image capturing apparatus comprising an acquisition unit which acquires the unregistered foreign substance information which is additionally registered by the additional registration unit of the image processing apparatus described above and an updating unit which updates foreign substance information, which has already been stored in a storage unit, on the basis of the unregistered foreign substance information acquired by the acquisition unit.

According to a third aspect of the present invention, there is provided an image capturing apparatus comprising a display unit which displays a shot image, a correction unit which corrects the shot image so as to reduce an influence of the shadow of the foreign substance on the basis of foreign substance information which is information associated with the shot image and concerning at least a position and size of the foreign substance existing on a shooting optical path, an input unit which is used by a user to input additional foreign substance information in accordance with the shot image displayed on the display unit, and an additional registration unit which additionally registers the additional foreign substance information input by the input unit in the foreign substance information when the additional foreign substance information is unregistered foreign substance information.

According to a fourth aspect of the present invention, there is provided a method of controlling an image processing apparatus which corrects a shot image, which is shot by an image capturing apparatus and on which a shadow of a foreign substance existing on a shooting optical path of the image capturing apparatus is captured, so as to reduce an influence of the shadow of the foreign substance, the method comprising a display step of displaying the shot image, a correction step of correcting the shot image so as to reduce the influence of the shadow of the foreign substance on the basis of foreign substance information which is information associated with the shot image and concerning at least a position and size of the foreign substance existing on the shooting optical path of the image capturing apparatus, and an addition registration step of additionally registering, in the foreign substance information, unregistered foreign substance information which has been input by a user in accordance with the shot image displayed in the display step and has not been registered in the foreign substance information.

Further features of the present invention will become apparent from the following description of exemplary embodiments with reference to the attached drawings.

BRIEF DESCRIPTION OF THE DRAWINGS

FIG. 5 is a view showing an example of the data format of dust correction data;

FIG. 15 is a view showing the data structure of the editing history of an image editing program;

FIG. 21 is a view showing the data format of a link table;

DESCRIPTION OF THE EMBODIMENTS

The preferred embodiments of the present invention will be described in detail below with reference to the accompanying drawings.

First Embodiment

In this embodiment, a camera body detects dust, and attaches dust correction data, which is information about the position, size, and the like of the dust, to image data. The embodiment uses an image processing apparatus outside the camera to perform dust removal processing for the image data by using the dust correction data attached to the image data.

Figure 1:
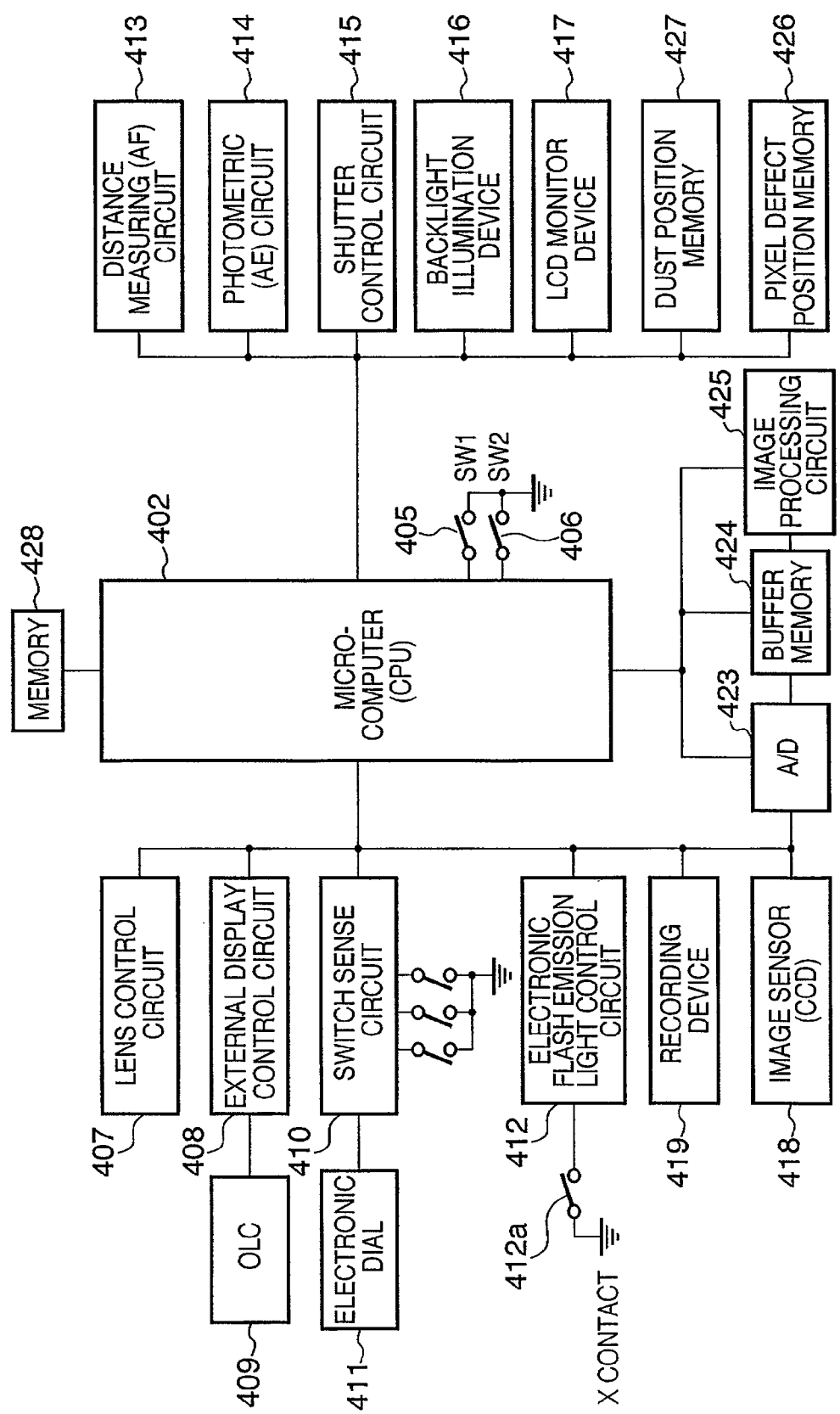
FIG. 1 is a block diagram showing the circuit arrangement of a lens interchangeable single-lens reflex digital camera as an image capturing apparatus according to the first embodiment of the present invention.

FIG. 1 is a block diagram showing the circuit arrangement of a lens interchangeable single-lens reflex digital camera according to the first embodiment of the present invention.

Referring to FIG. 1, a microcomputer 402 performs control on the overall operation of the camera, including control on processing for image data output from an image sensor (a CCD in this embodiment) 418 and display control on an LCD monitor device 417. Note that the image sensor 418 comprises a two-dimensional array of pixels which photoelectrically convert an object image.

When the user half-presses a release button 114 (see FIG. 2), a switch (SW1) 405 is turned on. When the switch (SW1) 405 is turned on, the digital camera of this embodiment is ready for shooting. When the user presses the release button 114 to the second stroke position (in a fully pressed state), a switch (SW2) 406 is turned on. When the switch (SW2) 406 is turned on, the digital camera of this embodiment starts shooting operation.

A lens control circuit 407 performs driving control on a shooting lens 200 (see FIG. 3) and the aperture blade at the time of communication with the shooting lens 200 and AF (Auto Focus) operation.

Referring to FIG. 1, an external display control circuit 408 controls an external display device (OLC) 409 and a display device (not shown) in the viewfinder. A switch sense circuit 410 transmits signals from many switches including an electronic dial 411 provided in the camera to the microcomputer 402.

An electronic flash emission light control circuit 412 is grounded via an X contact 412a and controls an external electronic flash. A distance measuring circuit 413 detects the defocus amount of an object for AF operation. A photometric circuit 414 measures the luminance of the object.

A shutter control circuit 415 controls the shutter to perform correct exposure for the image sensor. The LCD monitor device 417 and a backlight illumination device 416 constitute an image display device. A recording device 419 is, for example, a hard disk drive or semiconductor memory card which is detachable from the camera body.

An A/D converter 423, an image buffer memory 424, an image processing circuit 425 comprising a DSP and the like, and a pixel defect position memory 426 storing information indicating that a predetermined pixel itself in the image sensor is defective are connected to the microcomputer 402. A dust position memory 427 storing a pixel position in the image sensor at which an image defect is caused by dust is also connected to the microcomputer 402. Note that nonvolatile memories are preferably used as the pixel defect position memory 426 and the dust position memory 427. The pixel defect position memory 426 and the dust position memory 427 can store information using different addresses within the same memory space.

A reference numeral 428 denotes a nonvolatile memory which stores programs and the like executed by the microcomputer 402.

Figure 2:
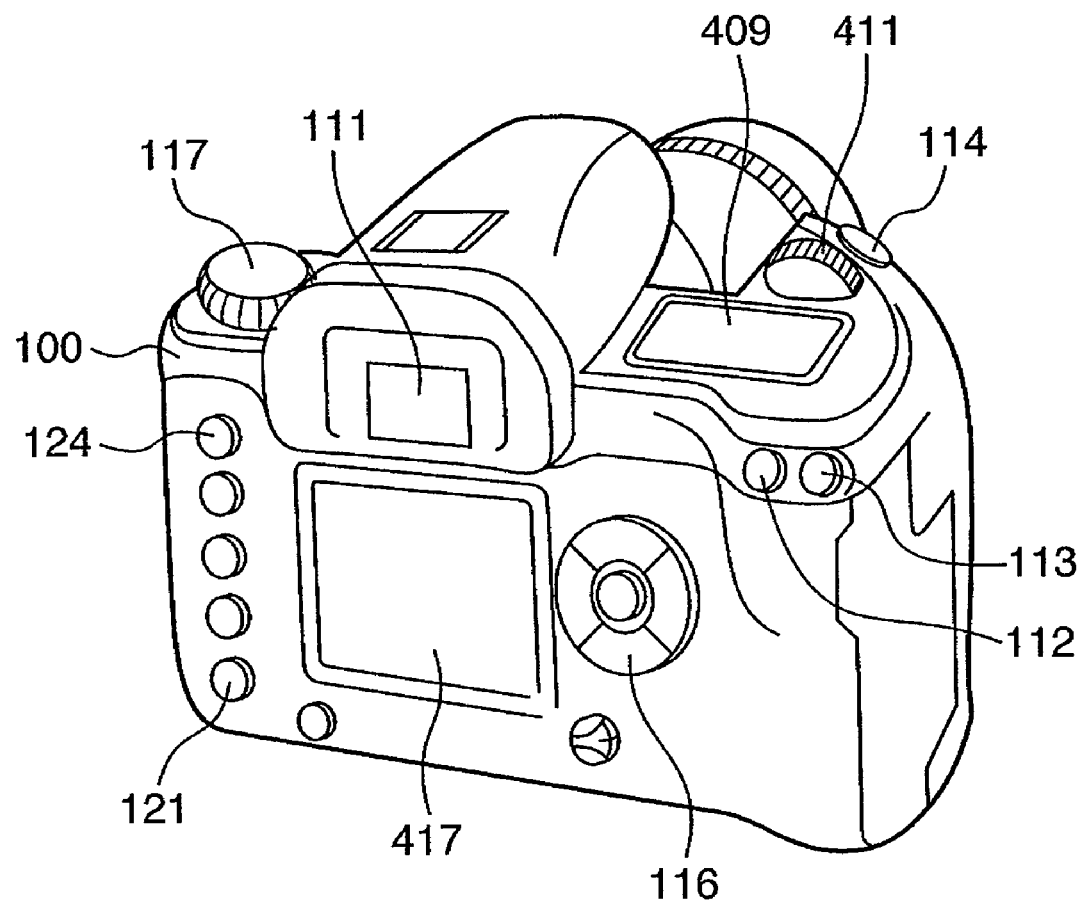
FIG. 2 is a perspective view showing the outer appearance of the digital camera according to the first embodiment.
Figure 3:
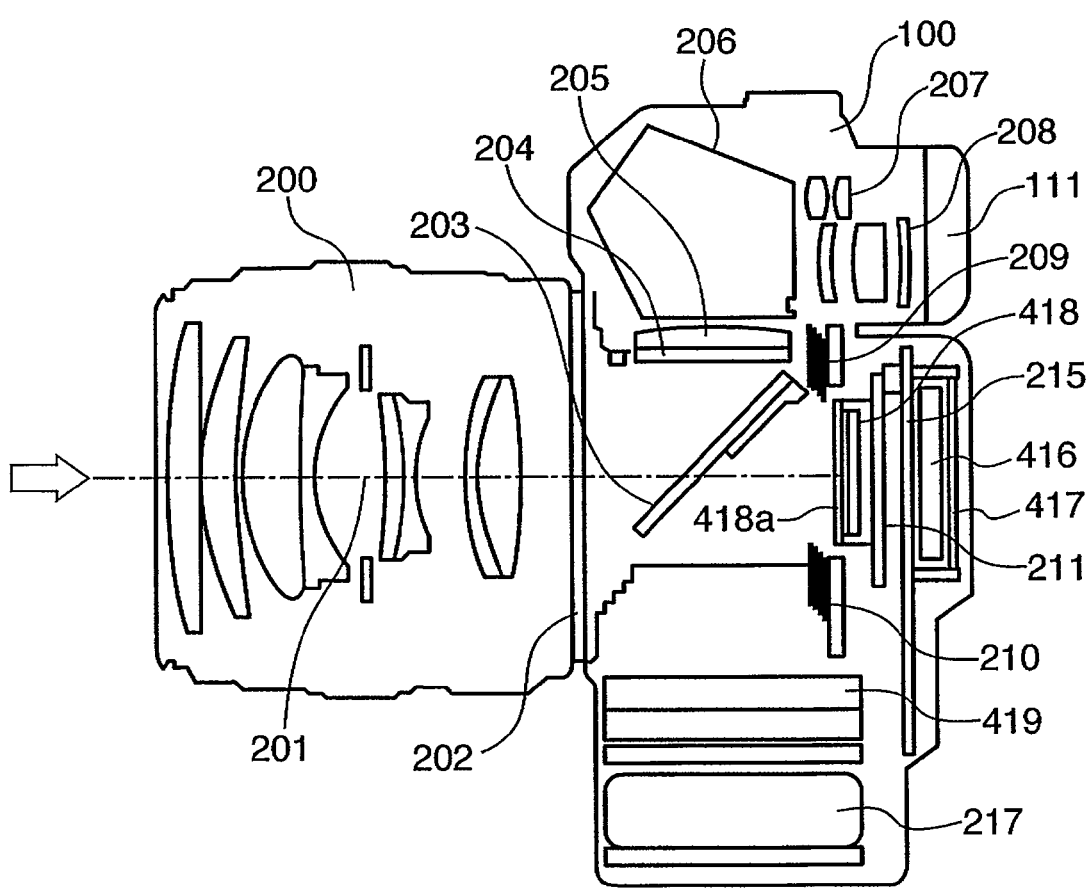
FIG. 3 is a vertical sectional view showing the internal structure of the digital camera according to the first embodiment.

FIG. 2 is a perspective view showing the outer appearance of the digital camera according to this embodiment. FIG. 3 is a vertical sectional view of FIG. 2.

Referring to FIG. 2, an eyepiece window 111 for viewfinder observation, an AE (Auto Exposure) lock button 112, an AF distance measuring position selection button 113, and the release button 114 for shooting operation are provided on the upper portion of a camera body 100. The electronic dial 411, a shooting mode selection dial 117, and the external display device 409 are also provided on the upper portion of the camera body 100. The electronic dial 411 is a multifunctional signal input device for inputting numerical values to the camera and switching the shooting modes in combination with other operation buttons. The external display device 409 comprises a liquid display device, and displays shooting conditions such as a shutter speed, aperture value, and shooting mode, and other information.

The LCD monitor device 417 which displays shot images, various setting windows, and the like, a monitor switch 121 for turning on/off the LCD monitor device 417, a cross switch 116, and a menu button 124 are provided on the rear surface of the camera body 100.

The cross switch 116 includes four buttons arranged vertically and horizontally and a SET button placed in the center. The user uses the cross switch 116 to issue, to the camera, an instruction to select or execute a menu item displayed on the LCD monitor device 417.

The menu button 124 is a button for causing the LCD monitor device 417 to display a menu window for making various settings for the camera. When selecting and setting a shooting mode, the user selects a desired mode by operating the up, down, left, and right buttons of the cross switch 116 upon pressing the menu button 124, and then presses the SET button while the desired mode is selected, thus completing the setting. The menu button 124 and the cross switch 116 are also used to set a dust detection mode (to be described later), a display mode in the dust detection mode, and the like.

Since the LCD monitor device 417 in this embodiment is of the transmission type, the device does not allow the user to visually check an image by only driving the LCD monitor device, and requires the backlight illumination device 416 on the rear surface, as shown in FIG. 3. The LCD monitor device 417 and the backlight illumination device 416 constitute an image display device.

As shown in FIG. 3, the shooting lens 200 as a part of the shooting optical system is detachable from the camera body 100 via a lens mount 202. Referring to FIG. 3, reference numeral 201 denotes a shooting optical axis; and 203, a quick return mirror.

The quick return mirror 203 is placed in the shooting optical path, and can move between a position at which it guides object light from the shooting lens 200 to the viewfinder optical system (the position shown in FIG. 3 which will be referred to as a tilt position) and a position (to be referred to as a retreat position) at which the mirror retreats from the shooting optical path.

Referring to FIG. 3, object light guided from the quick return mirror 203 onto the viewfinder optical system is formed into an image on a focusing screen 204. Reference numeral 205 denotes a condenser lens for improving the visibility of the viewfinder; and 206, a pentagonal roof prism which guides object light passing through the focusing screen 204 and the condenser lens 205 to an eyepiece lens 208 for viewfinder observation and a photometric sensor 207.

Reference numerals 209 and 210 respectively denote rear and front curtains constituting a shutter. Opening the rear curtain 209 and the front curtain 210 will expose the image sensor 418, which is a solid-stage image sensor placed behind them, with light for a necessary period of time. A shot image converted into an electrical signal for each pixel by the image sensor 418 is processed by the A/D converter 423, image processing circuit 425, and the like. The resultant data is recorded as image data on the recording device 419.

The image sensor 418 is held on a printed board 211. A display board 215 which is another printed board is placed behind the printed board 211. The LCD monitor device 417 and the backlight illumination device 416 are arranged on the opposite side of the display board 215.

An optical member 418a such as an optical low-pass filter or an infrared cut filter is placed on the shooting optical axis 201 in front of the image sensor 418. When a foreign substance such as dust adheres to the surface of the optical member 418a placed in front of the image sensor 418, the foreign substance is captured on an image photoelectrically converted by the image sensor 418. This embodiment relates to a technique of correcting the image on which this foreign substance is captured.

Reference numeral 419 denotes the recording device which records image data; and 217, a battery (portable power supply). The recording device 419 and the battery 217 are detachable from the camera body.

(Dust Detection Processing)

Figure 4:
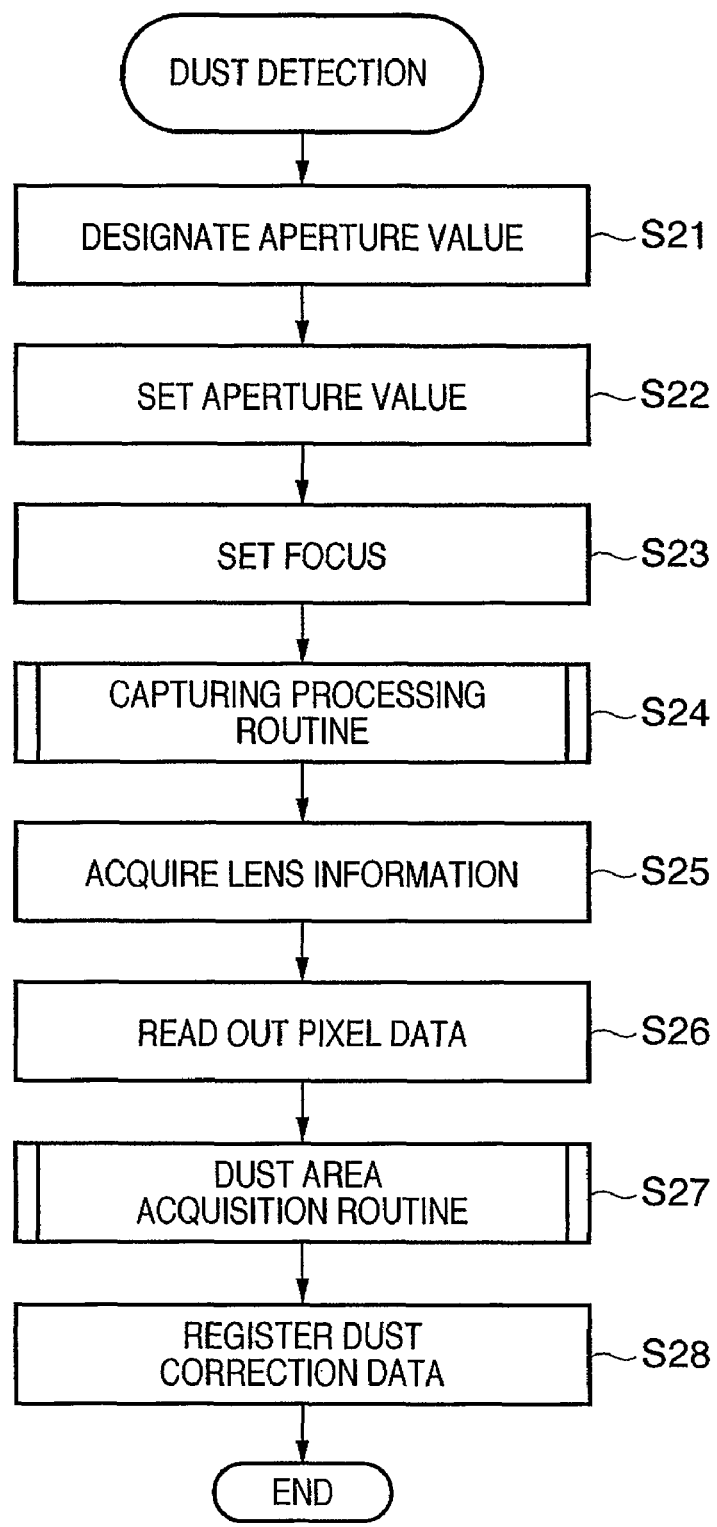
FIG. 4 is a flowchart for explaining dust detection processing in the digital camera according to the first embodiment.

FIG. 4 is a flowchart for explaining dust detection processing (the processing of detecting a pixel position at which an image defect is caused by dust) in the digital camera according to this embodiment. The microcomputer 402 executes this processing by executing the dust detection processing program stored in the memory 428.

This dust detection processing is the processing of detecting the position, size, and the like of the shadow of dust which adheres to the surface of the optical member 418a placed in front of the image sensor 418 and is imaged on a shot image.

Dust detection processing is performed by capturing a dust detection image. When performing dust detection processing, the user places the camera so as to direct the shooting optical axis 201 of the shooting lens 200 to a surface with a uniform color such as the exit surface of a surface light source device or a white wall, and makes preparations for dust detection. Alternatively, the user attaches a light unit for dust detection (a compact point light source to be attached instead of a lens) to the lens mount 202, and makes preparations for dust detection. As the light unit, for example, a white LED can be used. It is preferable to adjust the size of the light-emitting surface to a value equivalent to a predetermined aperture value (e.g., F64 in this embodiment).

This embodiment exemplifies a case in which a general shooting lens is used. However, it suffices to perform dust detection by attaching the above light unit to the lens mount 202. As described above, in this embodiment, a dust detection image is an image having a uniform color.

When the user issues an instruction to start dust detection processing by using, for example, the cross switch 116 upon completion of preparations for the processing, the microcomputer 402 makes aperture setting first. The imaged state of dust near the image sensor changes depending on the aperture value of the lens, and the position of the dust image changes depending on the pupil position of the lens. Dust correction data, therefore, needs to hold an aperture value and the pupil position of the lens at the time of detection in addition to the position and size of dust.

If, however, it is determined in advance in the stage of generating dust correction data that the same aperture value is used regardless whether different lenses are used, it is not always necessary to hold any aperture value in the dust correction data. In addition, using a light unit or allowing the use of only a specific lens will eliminate the need to hold any pupil position in dust correction data. That is, in the stage of generating dust correction data, when the use of a plurality of lenses is permitted or the aperture value to be set is changed as needed, it is necessary to hold an aperture value and the pupil position of a lens at the time of detection in dust correction data. Note that the pupil position in this case indicates the distance from the capturing plane (focal plane) of an exit pupil.

The flowchart will be described in detail below.

First of all, when dust detection processing is started, the aperture value of the shooting lens 200 is designated. In this case, for example, F16 is designated (step S21).

The microcomputer 402 then causes the lens control circuit 407 to perform aperture blade control on the shooting lens 200 to set the aperture to the aperture value designated in step S21 (step S22). In addition, the microcomputer 402 sets the focus position to the infinite distance (step S23).

When the aperture value and focus position of the shooting lens are set, the microcomputer 402 executes shooing in the dust detection mode (step S24). The details of the capturing processing routine performed in step S24 will be described later with reference to FIG. 9. The image buffer memory 424 stores shot image data.

When the shooting operation is complete, the microcomputer 402 acquires the aperture value and the lens pupil position at the time of shooting (step S25). The image processing circuit 425 reads out data corresponding to each pixel of the shot image stored in the image buffer memory 424 (step S26).

Figure 6:
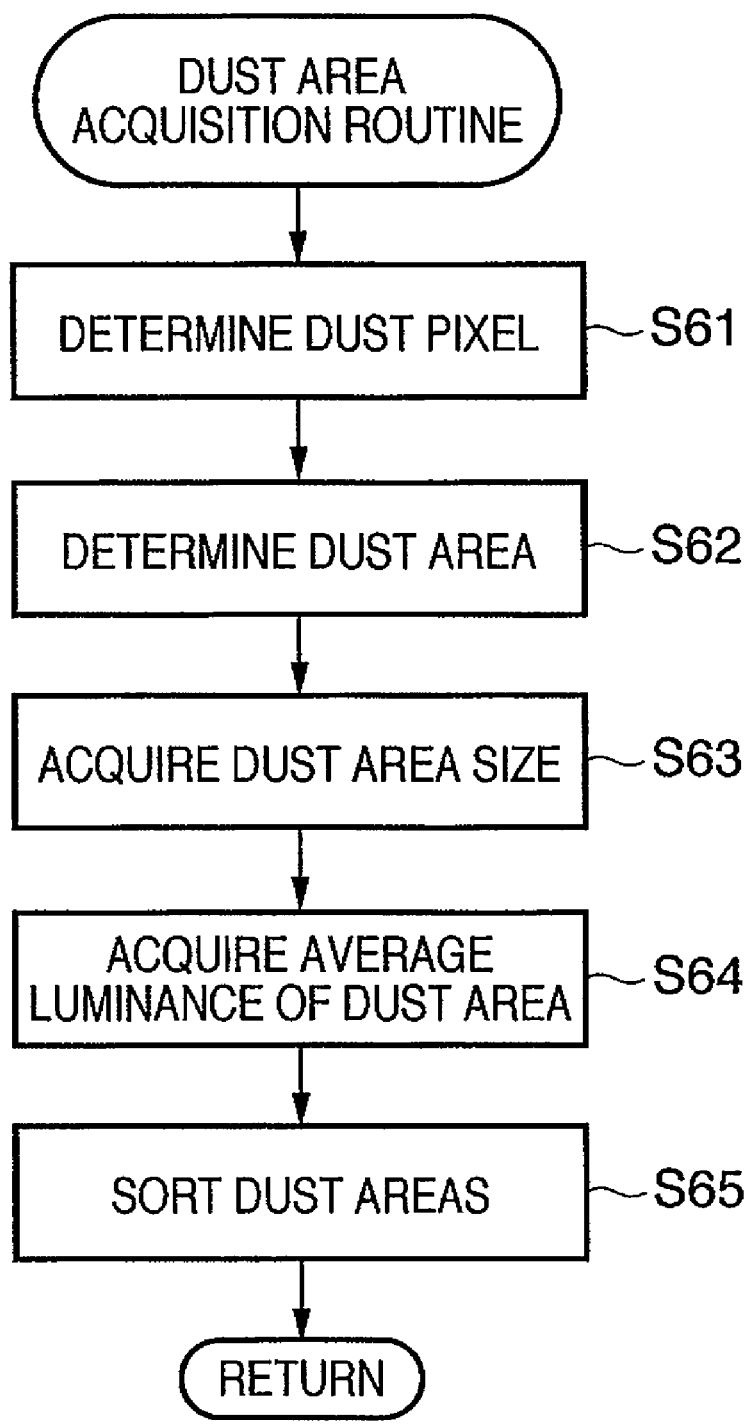
FIG. 6 is a flowchart for explaining details of a dust area acquisition routine in step S27 in FIG. 4.

The image processing circuit 425 performs the processing shown in FIG. 6 to acquire the position and size of a pixel in which a dust area (the shadow of the dust) exists (step S27).

The microcomputer 402 registers, in the dust position memory 427, the position and size of the pixel in which the dust area exists, which are acquired in step S27, and the aperture value and lens pupil position information acquired in step S25 (step S28).

If the above light unit is used in this case, no lens information can be acquired. If no lens information can be acquired, therefore, it is determined that the light unit is used, and predetermined lens pupil position information and the equivalent aperture value calculated from the light source diameter of the light unit are registered.

In step S28, the position of each defective pixel (pixel defect) in manufacturing, which is recorded on the pixel defect position memory in advance, is compared with the position of each readout pixel data to check whether a pixel defect is present. The position of only an area determined to have a defect other than a pixel defect is registered in the dust position memory 427.

FIG. 5 shows an example of the data format of dust correction data stored in the dust position memory 427. As shown in FIG. 5, lens information and information representing the position and size of dust at the time of shooting of a detection image are stored as dust correction data. The dust correction data is added to an image together with the information of image data at the time of general shooting and used in dust removal processing to be described later.

More specifically, an actual aperture value (F-number) and lens pupil position at the time of shooting of a detection image are stored as lens information at the time of shooting of a detection image. The number (integral value) of detected dust areas is stored in the storage area. Then, individual parameters for each dust area are stored repeatedly in correspondence with the number of dust regions. The dust area parameters include a set of three numerical values: the radius (for example, two bytes) of the dust area, the x-coordinate (for example, two bytes) of the center of the effective image area, and the y-coordinate (for example, two bytes) of the center.

If the dust correction data size is restricted by, for example, the capacity of the dust position memory 427 or the like, data are preferentially stored in the chronological order of dust areas obtained in step 27. This is because the dust area acquisition routine in step S27 sorts the dust areas in descending order of noticeability.

(Dust Area Acquisition Routine)

The dust area acquisition routine in step S27 in FIG. 4 will be described next in detail with reference to FIGS. 6 to 8.

Figure 7:
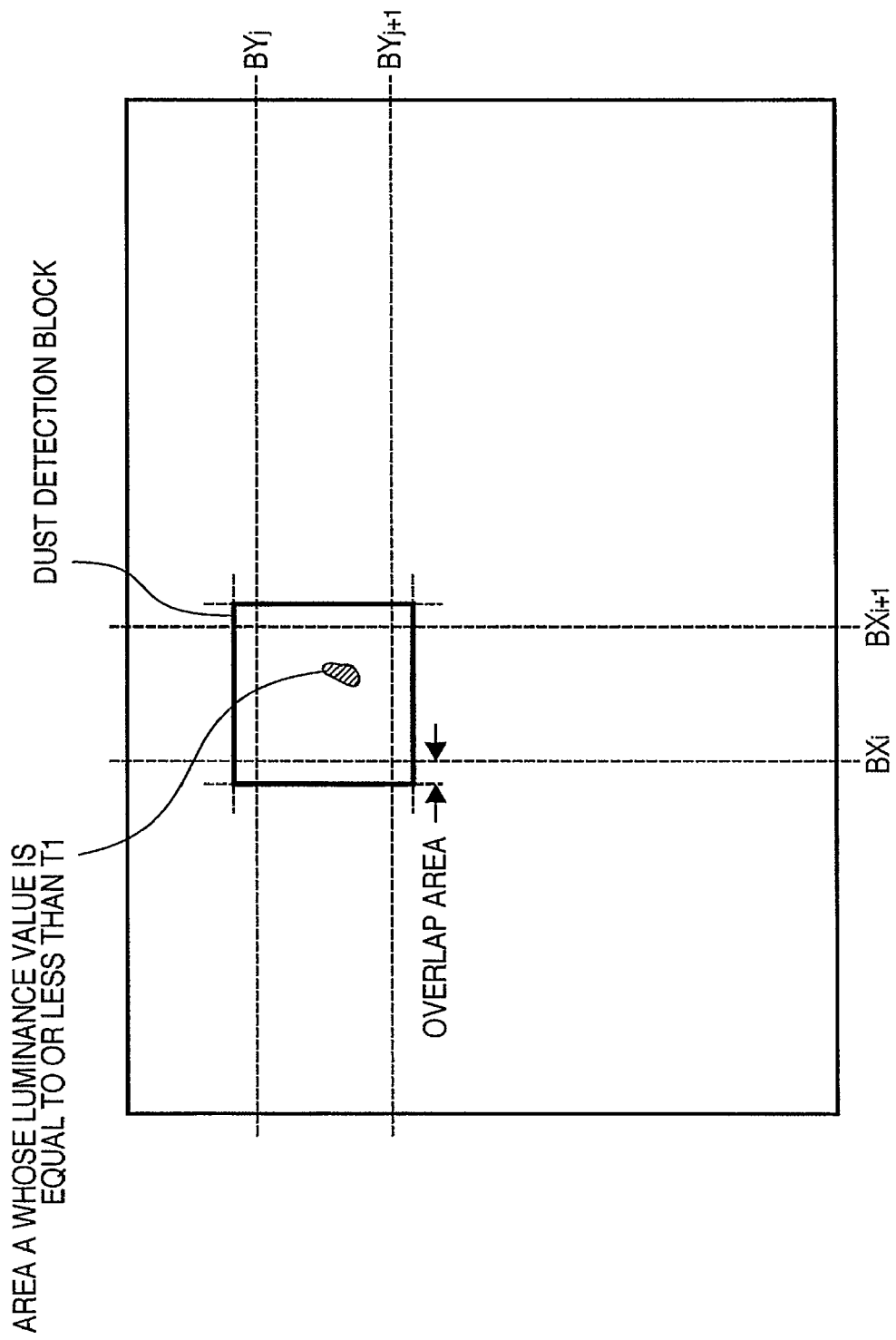
FIG. 7 is a view showing the process unit of dust area determination processing in step S62 in FIG. 6.

As shown in FIG. 7, readout image data is rasterized in the memory, and is processed on a predetermined block basis. Such processing is performed to cope with limb darkening due to the lens or sensor characteristic. Limb darkening is a phenomenon in which the luminance of the peripheral portion of a lens is lower than that of the central portion. It is known that limb darkening can be reduced to some degree by stopping down the lens. Even in the stopped down state, however, it is impossible for some lenses to accurately detect dust at the peripheral portion if the dust position is determined on the basis of a threshold value predetermined for a shot image. To prevent this, the influence of limb darkening is reduced by segmenting image data into blocks.

Simple block segmentation poses a problem that if the threshold value changes between blocks, the detection result on a dust area across the blocks becomes inaccurate. To prevent this, the blocks are overlapped, and a pixel determined as a dust area in any one of blocks constituting the overlap is handled as a dust area.

Dust area determination in a block is done in accordance with the procedure shown in FIG. 6. First of all, a maximum luminance Lmax and an average luminance Lave in the block are calculated. A threshold value T1 in the block is calculated by $$T1 = Lave \times 0.6 + Lmax \times 0.4$$

A pixel having a luminance which does not exceed the threshold value is regarded as a dust pixel (step S61). Each isolated area formed by dust pixels is defined as one dust area di (i=0, 1, ..., n) (step S62). As shown in FIG. 8, for each dust area, a maximum value Xmax and minimum value Xmin of the horizontal coordinates of the pixels constituting the dust area and a maximum value Ymax and minimum value Ymin of the vertical coordinates are obtained. A radius ri representing the size of the dust area di is calculated by the following equation (step S63).

$$ri = \sqrt{[\{(Xmax-Xmin)/2\}^2 + \{(Ymax-Ymin)/2\}^2]}$$

Figure 8:
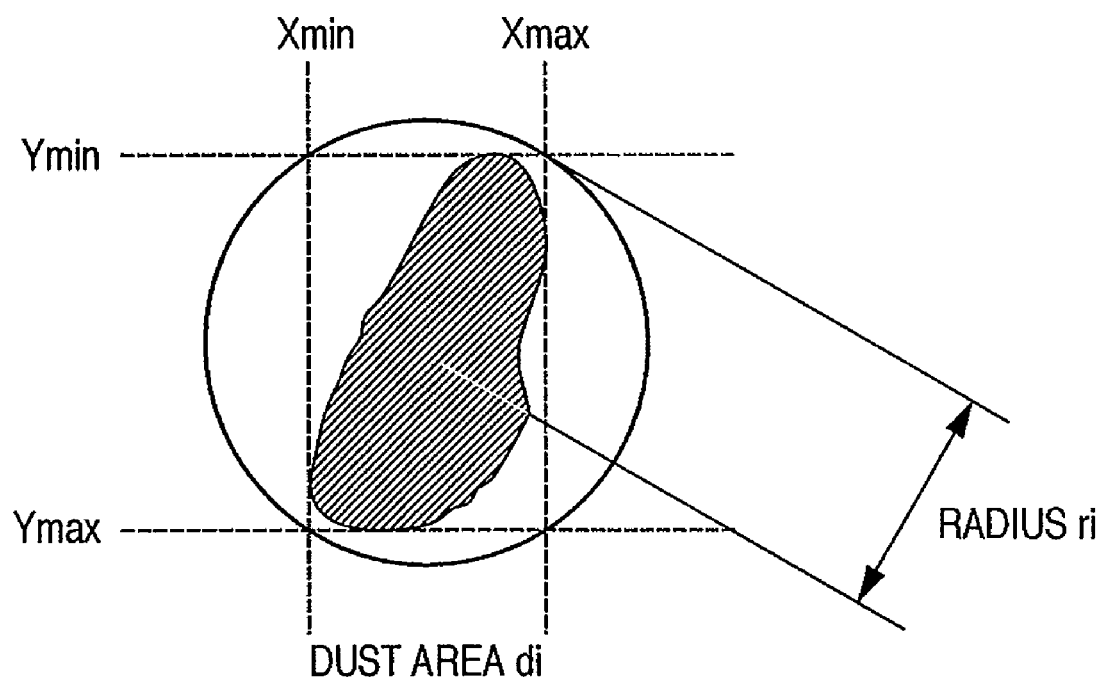
FIG. 8 is a view showing an outline of dust area size calculation in step S63 in FIG. 6.

FIG. 8 shows the relationship between Xmax, Xmin, Ymax, Ymin, and ri.

In step S64, the average luminance value of each dust area is calculated.

In some cases, the dust correction data size is restricted by, for example, the size of the dust position memory 427. To cope with such a case, the pieces of dust position information are sorted on the basis of the sizes or average luminance values of the dust areas (step S65). In this embodiment, sorting is done in descending order of ri. If ri is the same, sorting is done in ascending order of average luminance values. This allows to preferentially register noticeable dust in the dust correction data. Let Di be a sorted dust area, and Ri be the radius of the dust area Di.

Note that any dust area larger than a predetermined size can be excluded from the sorting targets and placed at the end of the sorted dust area list. A large dust area may degrade the image quality by interpolation processing later and is therefore preferably handled as a correction target with the lowest priority.

(Capturing Processing Routine)

Figure 9:
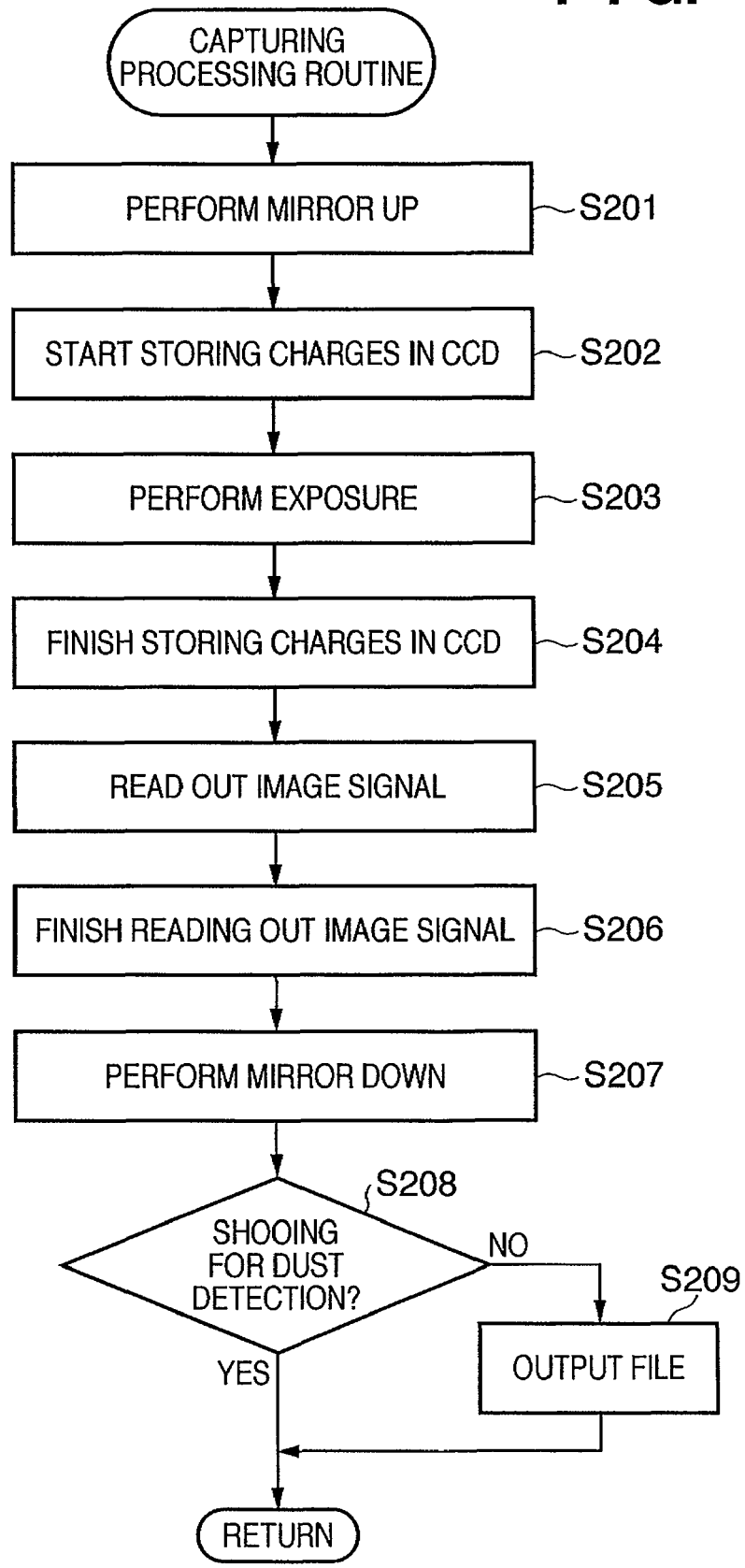
FIG. 9 is a flowchart for explaining details of a capturing processing routine in step S24 in FIG. 4.

The capturing processing routine in step S24 in FIG. 4 will be described next with reference to the flowchart shown in FIG. 9. The microcomputer 402 executes this processing by executing the capturing processing program stored in the memory 428.

When the capturing processing routine starts, the microcomputer 402 actuates the quick return mirror 203 shown in FIG. 3 to perform so-called mirror up in step S201 and make the quick return mirror 203 retreat from the shooting optical path.

In step S202, the image sensor 418 starts storing charges. In step S203, the front curtain 210 and rear curtain 209 of the shutter shown in FIG. 3 run to execute exposure. In step S204, the image sensor finishes storing charges. In step S205, the image signal is read out from the image sensor 418 and processed by the A/D converter 423 and the image processing circuit 425. The resultant image data is primarily stored in the image buffer memory 424.

When the readout of all image signals from the image sensor 418 is complete in step S206, the microcomputer 402 performs mirror down of the quick return mirror 203 in step S207 and returns the mirror to the tilt position, thereby terminating the series of capturing operations.

In step S208, the microcomputer 402 determines whether the operation is general shooting operation or dust detection image shooting operation. At the time of general shooting operation, the process advances to step S209 to record, on the recording device 419, the dust correction data shown in FIG. 5 together with the camera setting values at the time of shooting operation in association with the image data.

More specifically, data association can be implemented by additionally writing the dust correction data in, for example, an Exif area which is the header area of an image file on which the camera setting values at the time of shooting operation are recorded. Data association can also be achieved by recording the dust correction data as an independent file and recording, in the image data, only link information to the dust correction data file. However, if the image file and dust correction data file are separately recorded, the link relationship may be lost at the time of movement of an image file. Therefore, the dust correction data is preferably held integrally with the image data.

(Dust Removable Processing)

The procedure of dust removal processing will be described next. Dust removal processing is performed not in the camera body but on a separately prepared image processing apparatus.

Figure 10:
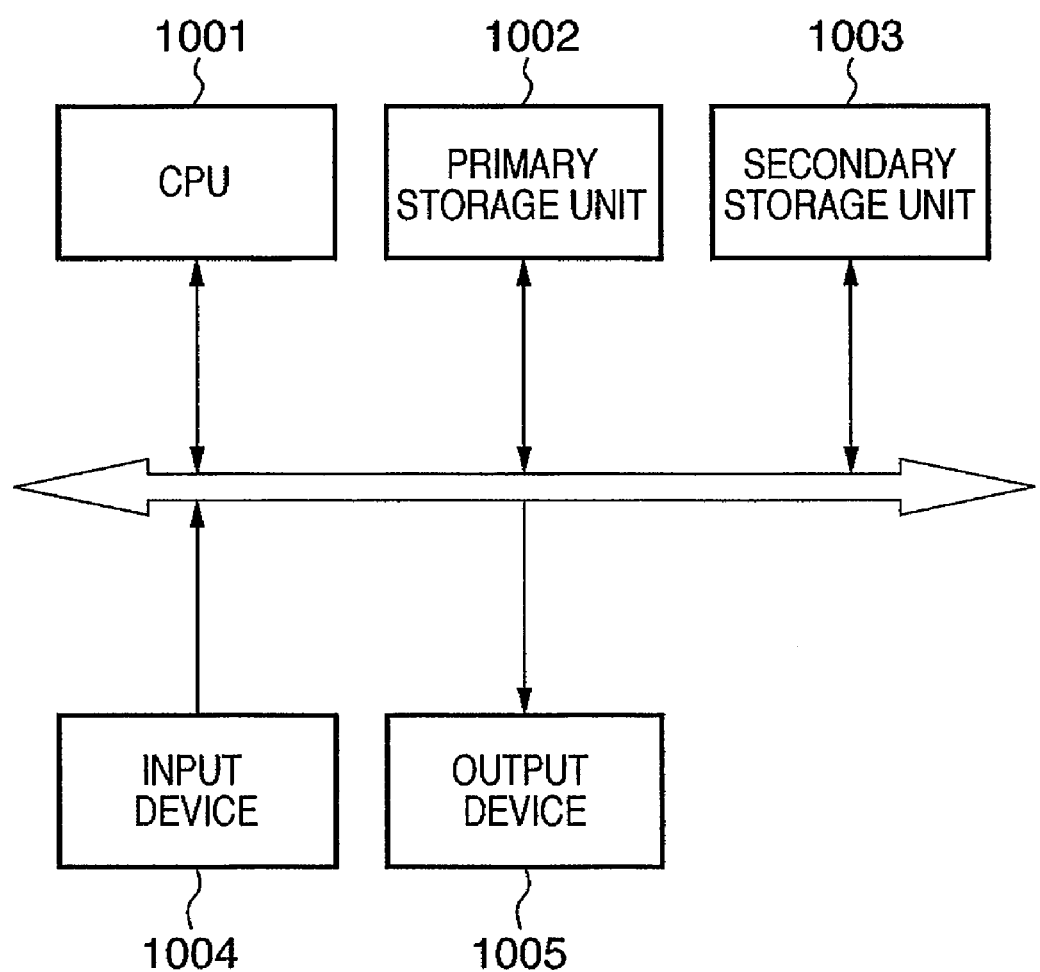
FIG. 10 is a block diagram schematically showing the system configuration of an image processing apparatus.

FIG. 10 schematically shows the system configuration of the image processing apparatus.

A CPU 1001 controls the overall operation of the system and executes, for example, a program stored in a primary storage unit 1002. The primary storage unit 1002 mainly includes a memory, which reads out a program from a secondary storage unit 1003 and stores it. The secondary storage unit 1003 corresponds to, for example, a hard disk. The capacity of the primary storage unit is generally smaller than that of the secondary storage unit. The secondary storage unit stores programs and data with a size beyond the capacity of the primary storage unit. The secondary storage unit 1003 also stores data that need to be stored for a long period of time. In this embodiment, the secondary storage unit 1003 stores a program. When executing the program, the CPU 1001 loads the program in the primary storage unit 1002 and executes it.

An input device 1004 corresponds to, for example, not only a mouse and keyboard used for system control but also a card reader, scanner, and film scanner necessary for inputting image data. Examples of an output device 1005 are a monitor and a printer. This apparatus can take various forms except that described above, although a repetitive description will be omitted because it is irrelevant to the gist of the present invention.

The image processing apparatus has an operating system capable of executing a plurality of programs in parallel. The operator can operate a program running on this apparatus by using GUI.

The image processing apparatus in this embodiment can execute two processes as image editing functions. One is a copy stamp process, and the other is a repair process. The copy stamp process is a function of combining some of the areas on a designated image with another area which is separately designated. The repair process is a function of detecting an isolated area in the designated areas which matches a predetermined condition, and interpolating the isolated area with surrounding pixels.

In addition, this apparatus has an automatic repair function of automatically executing a repair process for designated coordinates by using dust correction data associated with image data in the digital camera body.

These processes will be described in detail later.

Figure 11:
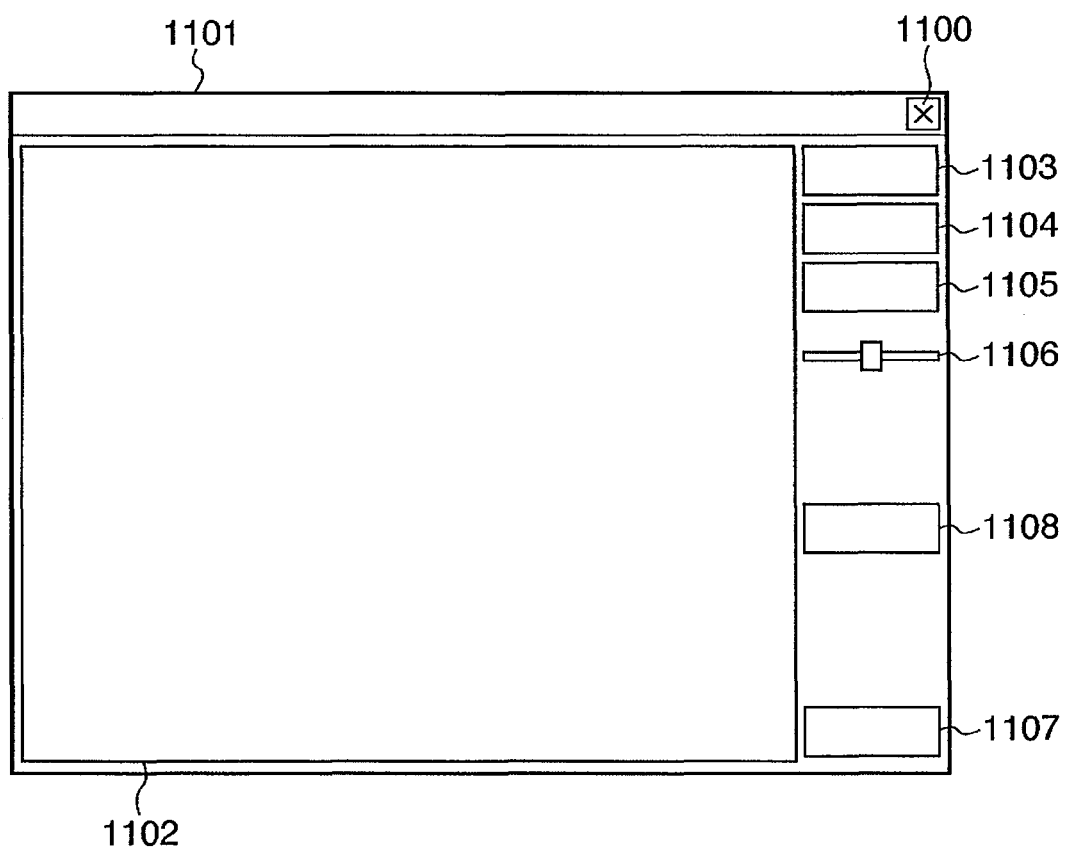
FIG. 11 is a view showing an example of a GUI in the image processing apparatus.

FIG. 11 is a view showing a GUI (Graphical User Interface) of an image editing program in the image processing apparatus. A window has a close button 1100 and a title bar 1101. When the user presses the close button, the program ends. A file is dragged and dropped onto an image display area 1102 to designate a correction target image. When the correction target image is determined, the file name is displayed on the title bar 1101, and the target image is Fit-displayed in the image display area 1102.

The editing target image is displayed in two states, i.e., a Fit-displayed state and a pixel one-to-one displayed state. Operating a display mode button 1108 can switch these displayed states. According to this GUI, a process position is designated by clicking on an image. In the Fit displayed state, coordinates on a processed image which correspond to a clicked position are calculated in accordance with a display magnification, and the process is applied to the calculated coordinates. According to this GUI, a processing range is designated by a radius. This radius is one on the editing target image, and sometimes differs from a radius on a Fit-displayed image depending on the display magnification.

When the user presses an automatic repair process execution button 1103, automatic dust removal processing (to be described later) is executed. The processed image is then displayed on the image display area 1102. The automatic repair process execution button 1103 becomes valid only when an image is not edited. The automatic repair process execution button 1103 becomes invalid after an image is edited upon execution of a copy stamp process, repair process, and automatic repair process.

A radius slider 1106 is a slider which designates application ranges for a copy stamp process and a repair process.

When the user presses a repair process mode button 1104, the repair process starts. The repair process mode described below is a manual repair process, which is executed on the basis of dust area designation by the user. When the user left-clicks a portion in the image in the repair process mode, a repair process (to be described later) is applied to an area having the left-clicked coordinates as a center and the number of pixels designated by the radius slider 1106 as a radius. The user can designate the central coordinates and size of a dust area by left-clicking and the radius slider 1106. After the application of the repair process, the process leaves the repair process mode. When the user right-clicks on the image display area 1102 in the repair mode or presses any button on the GUI, the process leaves the repair mode.

When the user presses a copy stamp process mode button 1105, the copy stamp mode starts. When the user left-clicks a portion in an image in the copy stamp mode, the left-clicked coordinates are set as the central coordinates of a copy source area. When the user further left-clicks on the image while the central coordinates of the copy source area are set, a copy stamp process is executed with the left-clicked coordinates being the central coordinates of the copy destination area and the radius designated by the radius slider 1106 at this time being a copy radius. The process then leaves the copy stamp mode while the central coordinates of a copy source area are kept unset. When the user right-clicks on the image display area 1102 in the copy stamp mode or presses any button on the GUI, the process leaves the copy stamp mode while the central coordinates of the copy source area are kept unset.

When the user presses a save button 1107, the processed image is saved.

Figure 14:
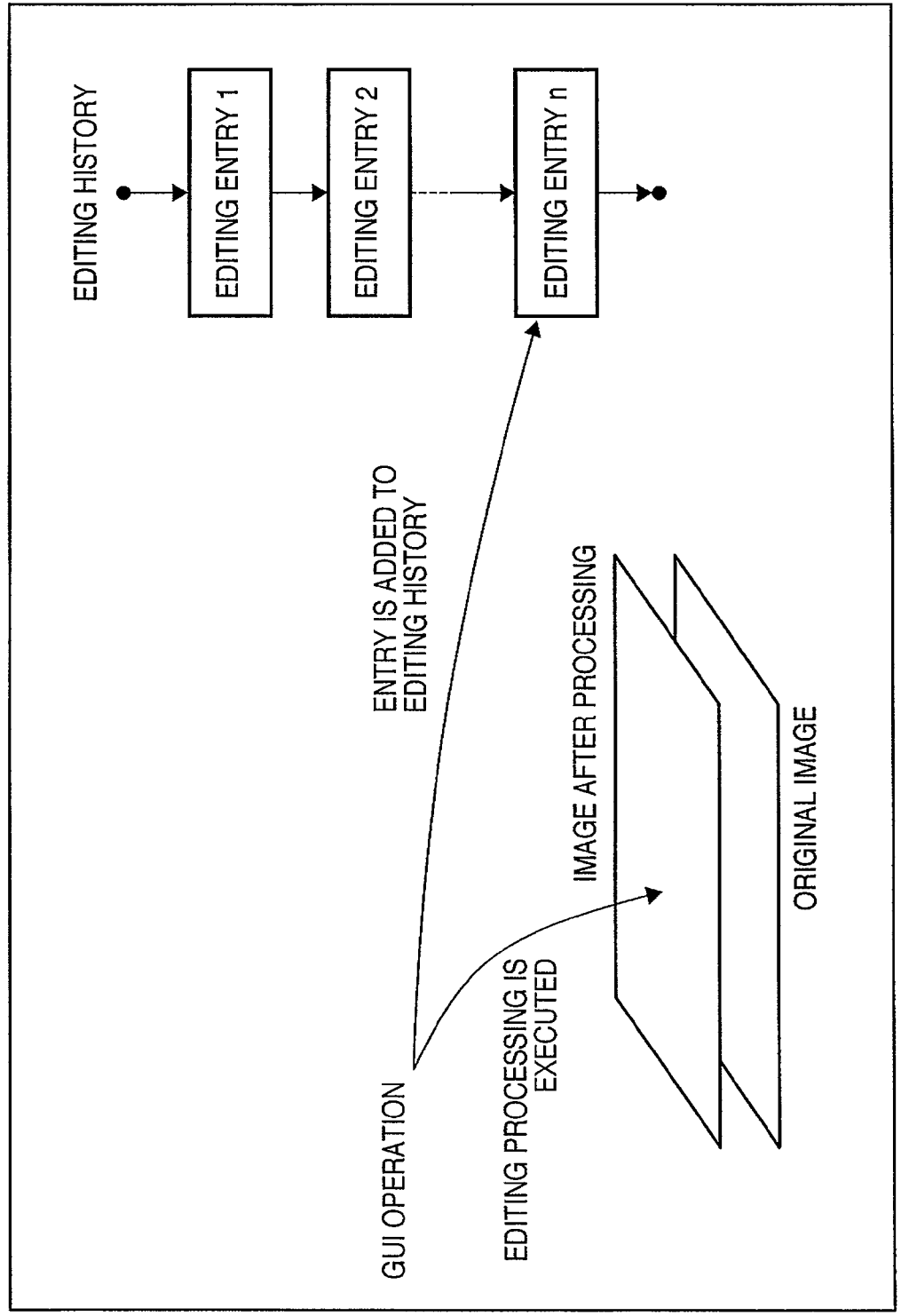
FIG. 14 is a view showing the internal structure of an image editing program.

This image editing program holds both a source image and an image after a process, as shown in FIG. 14. The editing process designated by the GUI is applied to the above processed image, and the applied editing process is registered in an editing history. One editing process registered in the editing history will be referred to as an editing entry.

FIG. 15 shows an example of an editing entry. An editing entry in this embodiment holds a process ID for discriminating a copy stamp process from a repair process, a center and radius which indicate a process application area, relative coordinates from copy source coordinates to copy destination coordinates which are necessary for a copy stamp process, and difference image data to be described later. When an automatic repair process is executed, a repair process is executed in accordance with dust correction data. Every time a repair process is applied, an editing entry is added to the editing history.

Such implementation makes it possible to reconstruct a source image upon completely discarding an editing history or cancel an immediately preceding editing process.

For example, it is possible to implement the processing of canceling an immediately preceding editing process by temporarily overwriting a processed image with a source image and then re-executing the editing process up to an editing entry as a cancellation target. If, however, the number of entries is very large, it may take much time to re-execute the editing process. For this reason, every time editing operation is executed, the difference between image data before and after the execution of an editing process is held in an editing entry. Holding a difference image allows to replace the execution of the editing process written in an editing entry by only reflecting the difference image.

The details of a repair process and automatic repair process will be described next. A copy stamp process is a known technique, and hence a detailed description of this process will be omitted.

A repair process is the processing of detecting an isolated area in designated areas and interpolating the isolated area. The repair process is implemented by applying an interpolation routine (to be described later) to the area expressed by the central coordinates and radius designated with the GUI.

Figure 12:
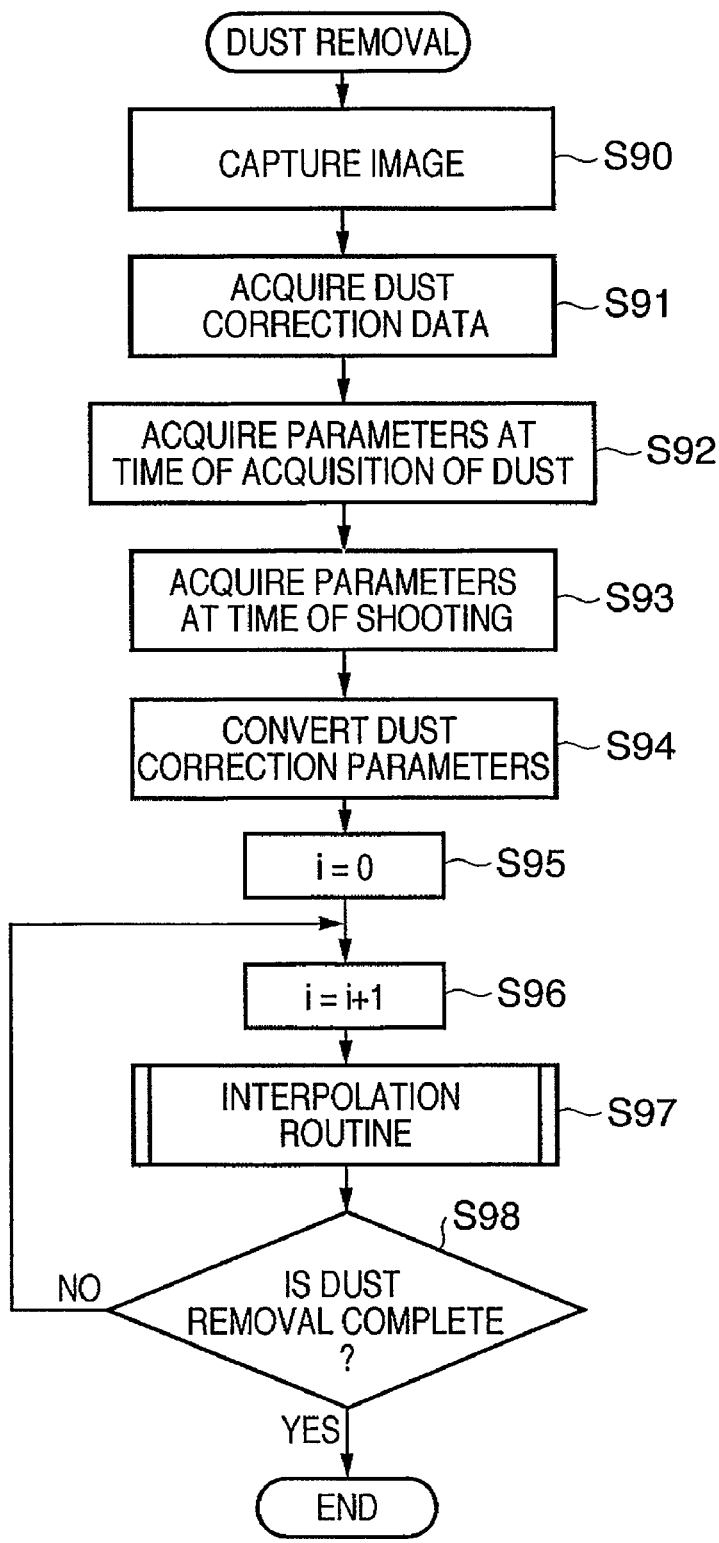
FIG. 12 is a flowchart for explaining the basic sequence of an automatic repair process.

In an automatic repair process, dust correction data is extracted from general shot image data, and a repair process is automatically executed in accordance with the dust correction data. FIG. 12 shows the basic procedure of an automatic repair process.

The image processing apparatus reads out general shot image data with dust correction data from the digital camera or the recording device 419 detached from the digital camera and stores the data in the primary storage unit 1002 or secondary storage unit 1003 (step S90).

The apparatus then extracts the dust correction data added to the shot image in step S209 from the general shot image data (dust removal processing target image) (step S91).

The apparatus obtains a coordinate sequence Di (i=1, 2, . . ., n), a radius sequence Ri (i=1, 2, . . . , n), an aperture value f1, and a lens pupil position L1 from the dust correction data extracted in step S91 (step S92). In this case, Ri represents the size of dust at the coordinates Di calculated in step S65 in FIG. 6.

In step S93, the apparatus acquires an aperture value f2 and a lens pupil position L2 at the time of general shooting of an image. In step S94, the apparatus converts Di by the following expression, where d is the distance from the image center to the coordinates Di, H is the distance between the dust and the surface of the image sensor 418. Coordinates Di' after conversion and a radius Ri' after conversion are defined by, for example, $$Di'(x,y)=(L2\times(L1-H)\times d/((L2-H)\times L1))\times Di(x,y)$$

$$Ri'=(Ri\times f1/f2+3)\times 2 \quad (1)$$

In this case, the unit is pixel, and "+3" for Ri' is the margin amount. (Ri×f1/f2+3) is doubled because an area except the dust area is necessary for detecting the dust area by using the average luminance.

In step S95, the apparatus initializes an interpolation processing count i to 0, and counts up the counter i in step S96.

In step S97, the apparatus executes an interpolation routine for the area represented by the ith coordinates Di' and the radius Ri' to remove the shadow of dust in the area. In step S98, the apparatus determines whether dust removal processing is applied to all coordinates. If YES in step S98, the apparatus terminates the processing. If NO in step S98, the process returns to step S96.

It is known that as the F-number at the time of shooting decreases (approaches the open F-number), the dust image blurs more and becomes less noticeable. It is therefore conceivable to eliminate the need to perform all repair processes when the F-number at the time of shooting is referred to before the execution of an automatic repair process and the referred value is less than a threshold. This makes it possible to omit an analysis process and efficiently perform processing even if there are many editing target images. In this embodiment, for example, when the aperture value is less than F8, an automatic repair process is skipped.

Figure 16:
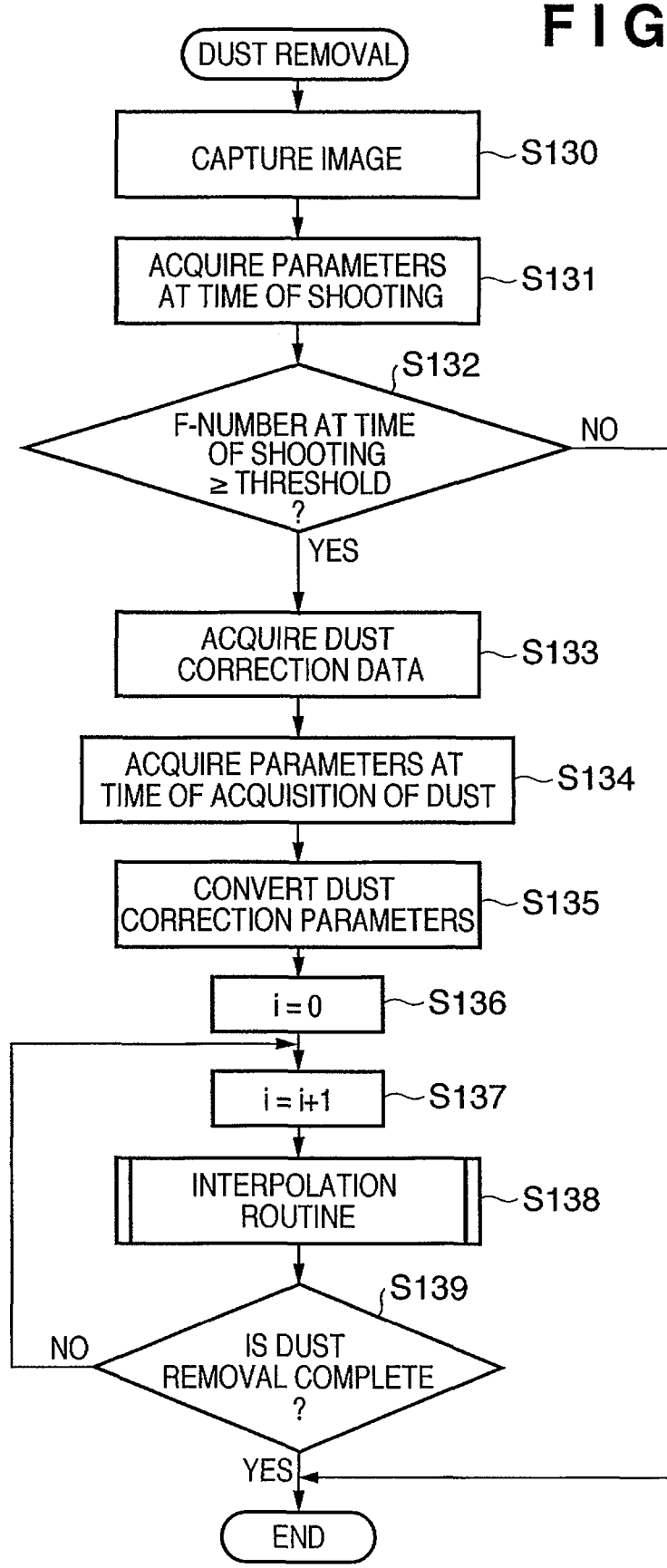
FIG. 16 is a flowchart showing the sequence of an automatic repair process in the first embodiment.

FIG. 16 shows the procedure of an automatic repair process modified in this manner.

This processing is the same as that shown in FIG. 12 except that parameters at the time of shooting are acquired before all processes, and the acquired parameters are compared with a threshold.

(Interpolation Routine)

An interpolation routine executed in a repair process and automatic repair process will be described below.

Figure 13:
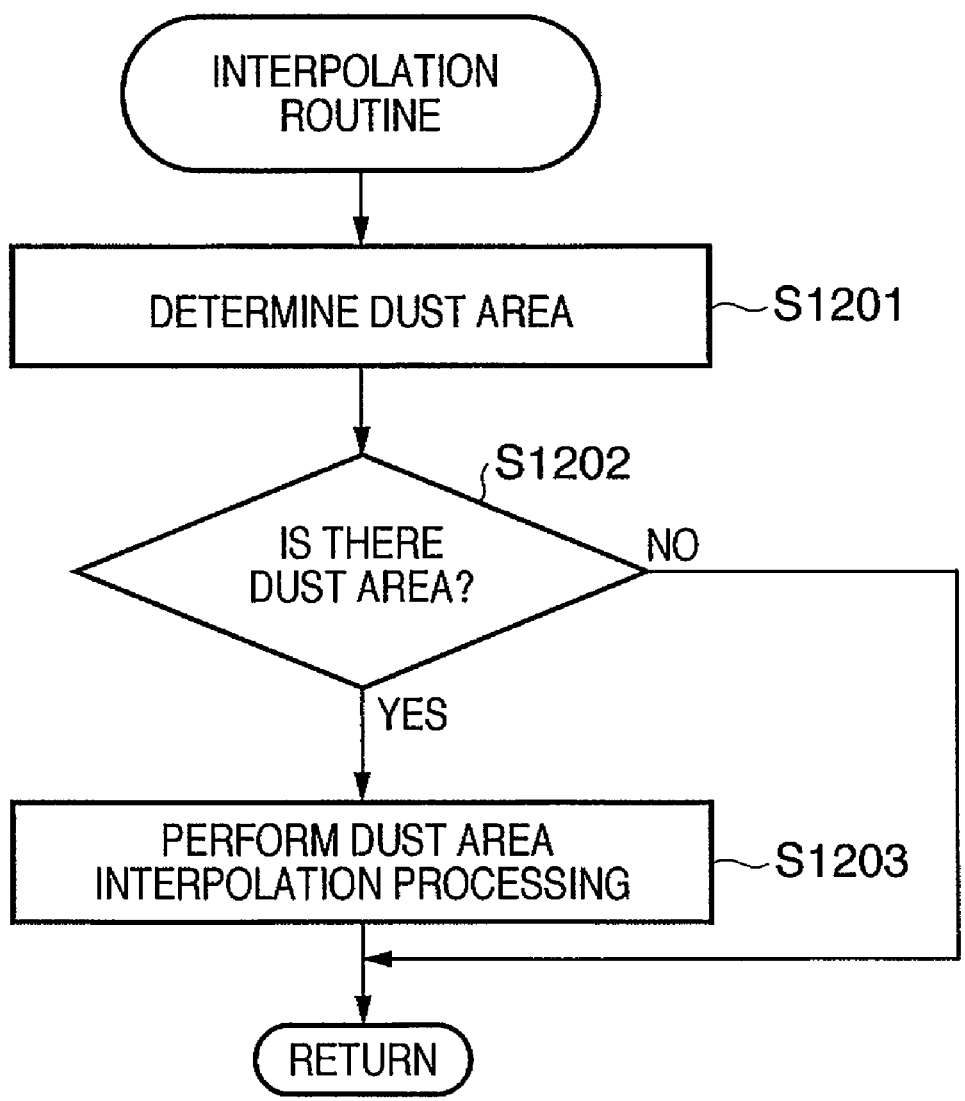
FIG. 13 is a flowchart for explaining the details of an interpolation routine.

FIG. 13 is a flowchart showing the procedure of the interpolation routine. First of all, in step S1201, dust area determination is performed. In this case, let P be the central coordinates of an area as a repair process target, and R be the radius of the area. A dust area is an area that satisfies all the following conditions.

(1) An area having a luminance lower than a threshold value T2 which is obtained by $$T2=Yave\times 0.6+Ymax\times 0.4$$

where Yave is the average luminance of pixels included in a repair process target area, and Ymax is the maximum luminance of the pixels.

(2) An area that does not contact the circle represented by the central coordinates P and the radius R.

(3) An area whose radius value calculated by the same method as that in step S63 in FIG. 6 is 11 pixels or more and less than 12 pixels in the isolated area constituted by low-luminance pixels selected in (1).

At the time of an automatic repair process, an area that satisfies the following condition in addition to the above conditions is set as a dust area.

(4) An area including the central coordinates P of the circle.

In this embodiment, 11 is three pixels, and 12 is 30 pixels. This allows to handle only an isolated small area as a dust area.

If it is determined in step S1202 that such an area exists, the process advances to step S1203 to execute dust area interpolation. If no area exists, the processing is terminated. The dust area interpolation processing in step S1203 is executed by a known defective area interpolation method. An example of the known defective area interpolation method is pattern replacement disclosed in Japanese Patent Laid-Open No. 2001-223894. The method disclosed in Japanese Patent Laid-Open No. 2001-223894 specifies a defective area by using infrared light. In this embodiment, the dust area detected in step S1201 is handled as a defective area, and pattern replacement is executed to interpolate the dust area by normal neighboring pixels. A pixel that cannot be compensated for by pattern replacement is interpolated by selecting p normal pixels in ascending order of distance from the interpolation target pixel in the image data interpolated by pattern replacement and q normal pixels in descending order of distance, and using the average color of the selected pixels.

As described above, attaching dust correction data to image data can eliminate the need to be aware of the correspondence between dust correction image data and shot image data. Since the dust correction data is compact data comprising position data, size data, and conversion data (aperture value and distance information of the lens pupil position), the shot image data size will not become excessively large. It is also possible to greatly reduce the detection error probability by interpolating only an area including pixels designated by the dust detection processing. Furthermore, more suitable processing can be performed by controlling, in accordance with the F-number at the time of shooting, whether to execute an automatic repair process.

(Additional Registration of Dust Correction Data)

The automatic repair process in the above image editing program cannot remove dust which has not registered in dust correction data. A method of additionally registering the dust data which is not registered in dust correction data in the dust correction data associated with an image will be described below.

In this embodiment, after an automatic repair process is executed, the information of dust which could not be corrected by the automatic repair process is additionally registered in dust correction data. In this processing, a dust area which could not be corrected by an automatic repair process is additionally registered in dust correction data when a repair process is executed for the dust area manually designated by the user. This additional registration processing for dust correction data will be described below with reference to the flowchart shown in FIG. 17.

First of all, in step S140, a manual repair process is executed for dust which could not be corrected by an automatic repair process. More specifically, when the automatic repair process is complete, the process automatically shifts to a manual repair process. When the process shifts to the manual repair process, the CPU 1001 waits for an instruction by the user with the input device 1004. The user searches the image display area 1102 for a dust area which has not been processed by the automatic repair process. If the user finds such an area, he/she designates a dust area by inputting coordinates and a size by left-clicking and using the radius slider 1106. If there are a plurality of dust areas which have not been processed by the automatic repair process, this processing is repeated. The CPU 1001 executes a repair process for the area for which an instruction is received from the user.

In step S141, the CPU 1001 determines whether the repair process is successful. If YES in step S141, the process advances to step S142. If NO in step S141, the CPU 1001 terminates this processing. More specifically, the CPU 1001 performs the above dust area determination for the dust area designated by the user. If the designated dust area is not determined as a dust area, this processing is handled as a failure.

In step S142, the CPU 1001 acquires dust correction parameters. The dust correction parameters in this case include the coordinates D' and radius R' of the dust area designated by the user by left-clicking and using the radius slider 1106.

In step S143, the CPU 1001 obtains an aperture value f1 and lens pupil position L1 from the dust correction data associated with the shot image.

In step S144, the CPU 1001 acquires the aperture value f2 and the lens pupil position L2 at the time of general shooting of an image. In step S145, the CPU 1001 converts D' and R' into the coordinates D and the radius R at the time of acquisition of a dust area. Let d be the distance from the image center to the coordinates D, and H be the distance between the dust and the surface of the image sensor 418. The coordinates D and radius R after conversion are defined by $$D(x,y)=(((L2-H)\times L1)/(L2\times(L1-H)\times d))\times D'(x,y)$$

$$R=(R'/2-3)\times f2/f1$$

In this case, the unit is pixel, and "−3" for R is the margin amount. R' is multiplied by ½ to exclude areas other than a dust area which are used to detect the dust area by using an average luminance. This expression represents an inversion conversion of expression (1) described above.

In step S146, the CPU 1001 additionally registers the coordinates and radius of the dust area converted in step S145 at the end of the dust correction data associated with the shot image. Note that if there are a plurality of dust areas designated by the user, it suffices to repeat the processing from step S414 to step S146 by the number of times corresponding to the number of dust areas.

In this manner, dust which has not been registered in dust correction data can be additionally registered in the dust correction data. With this operation, when, for example, an automatic repair process is to be performed after all editing processes are canceled, it is possible to use updated dust correction data and automatically remove even dust which could not been removed initially. It also suffices to additionally register, at the same time, dust information in not only dust correction data associated with an image under editing but also a plurality of shot images with which the same dust correction data is associated. To determine whether the dust correction data associated with a given image is the same as that associated with an image under editing, for example, shooting information attached to the image is used. That is, the shooting information such as the shooting date, camera ID, or camera type of an image under editing is compared with that of another image. When they coincide with each other, it is determined that the same dust correction data is associated with each image. The coordinates and radius of the dust area designated in the image under editing are additionally registered in the dust correction data associated with each image in accordance with the flowchart shown in FIG. 17.

In this embodiment, only when a manual repair process is successful, dust information is additionally registered in dust correction data. Obviously, however, the method to be used is not limited to that using a manual repair process, and another method can be used as long as it can designate the position of dust and issue an instruction to additionally register the corresponding information in dust correction data.

Alternatively, when the position of dust is designated by a manual repair process or the like and dust correction data is additionally registered in dust correction data, it suffices to perform additional registration processing upon determining whether the dust information has already been registered in the dust correction data. This determination is performed by, for example, comparing all the entries in dust correction data with the information of an additionally designated dust area. Likewise, when this technique is applied to the above plurality of images, it suffices to perform additional registration processing upon determining whether dust correction data associated with each image contains new dust information to be additionally registered.

Second Embodiment

In the first embodiment, dust correction data associated with a shot image is directly updated. The second embodiment includes an additional dust correction data table independently of dust correction data, and additionally registers the information of dust, which has not been registered in dust correction data, in the additional dust correction data table.

Figure 18:
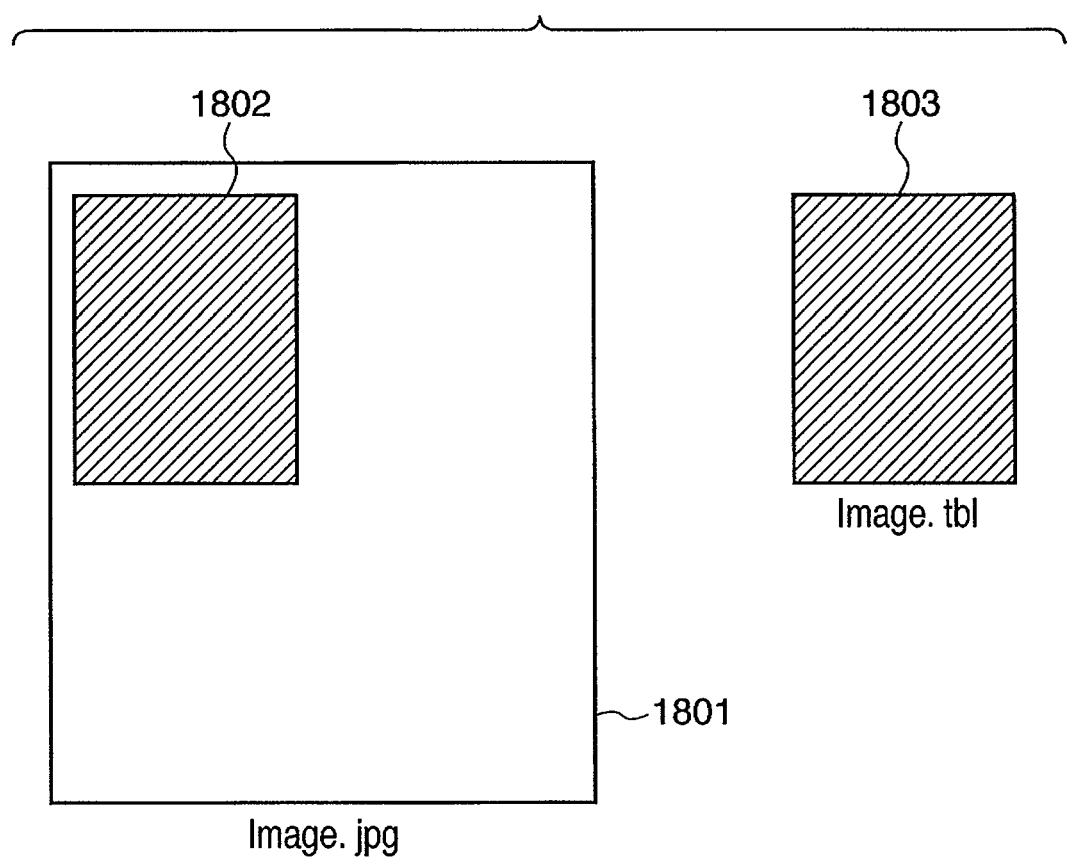
FIG. 18 is a view showing the relationship between a shot image, dust correction data, and an additional dust correction data table.

FIG. 18 shows the relationship between a shot image, dust correction data, and an additional dust correction data table.

Referring to FIG. 18, reference numeral 1801 denotes a shot image file; 1802, dust correction data associated with an Exif area which is the header area of a shot image file; and 1803, an additional dust correction data table. The dust correction data 1802 and the additional dust correction data table 1803 are stored in a data format like that shown in FIG. 5 in the first embodiment. The file name of the additional dust correction data table 1803 is obtained by changing the extension of the file name of the shot image file 1801. In this case, for example, the extension of the additional dust correction data table is ".tbl".

Figure 19:
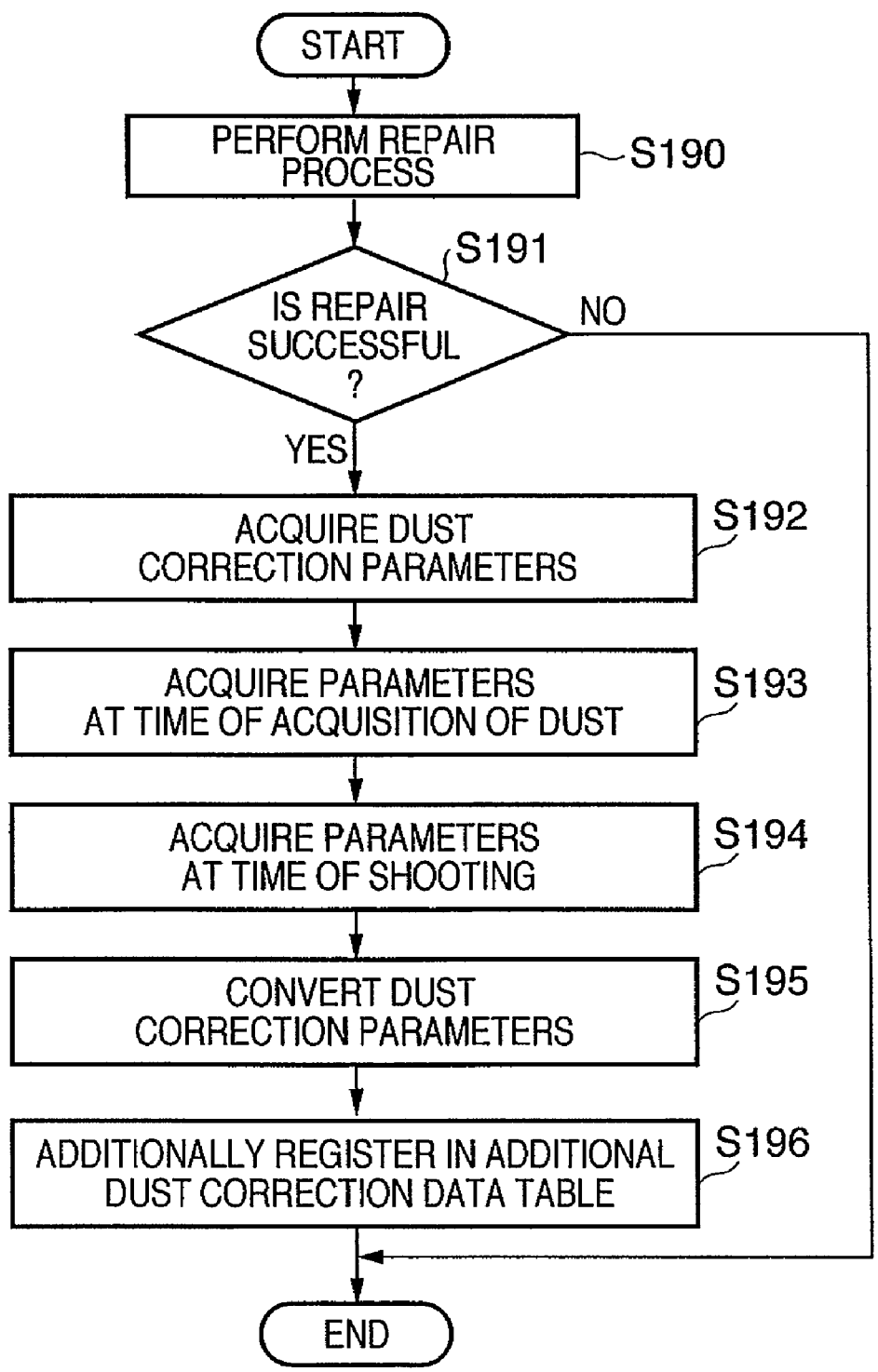
FIG. 19 is a flowchart showing unregistered dust additional registration processing in the second embodiment.

FIG. 19 is a flowchart showing additional registration processing for unregistered dust in this embodiment.

Figure 17:
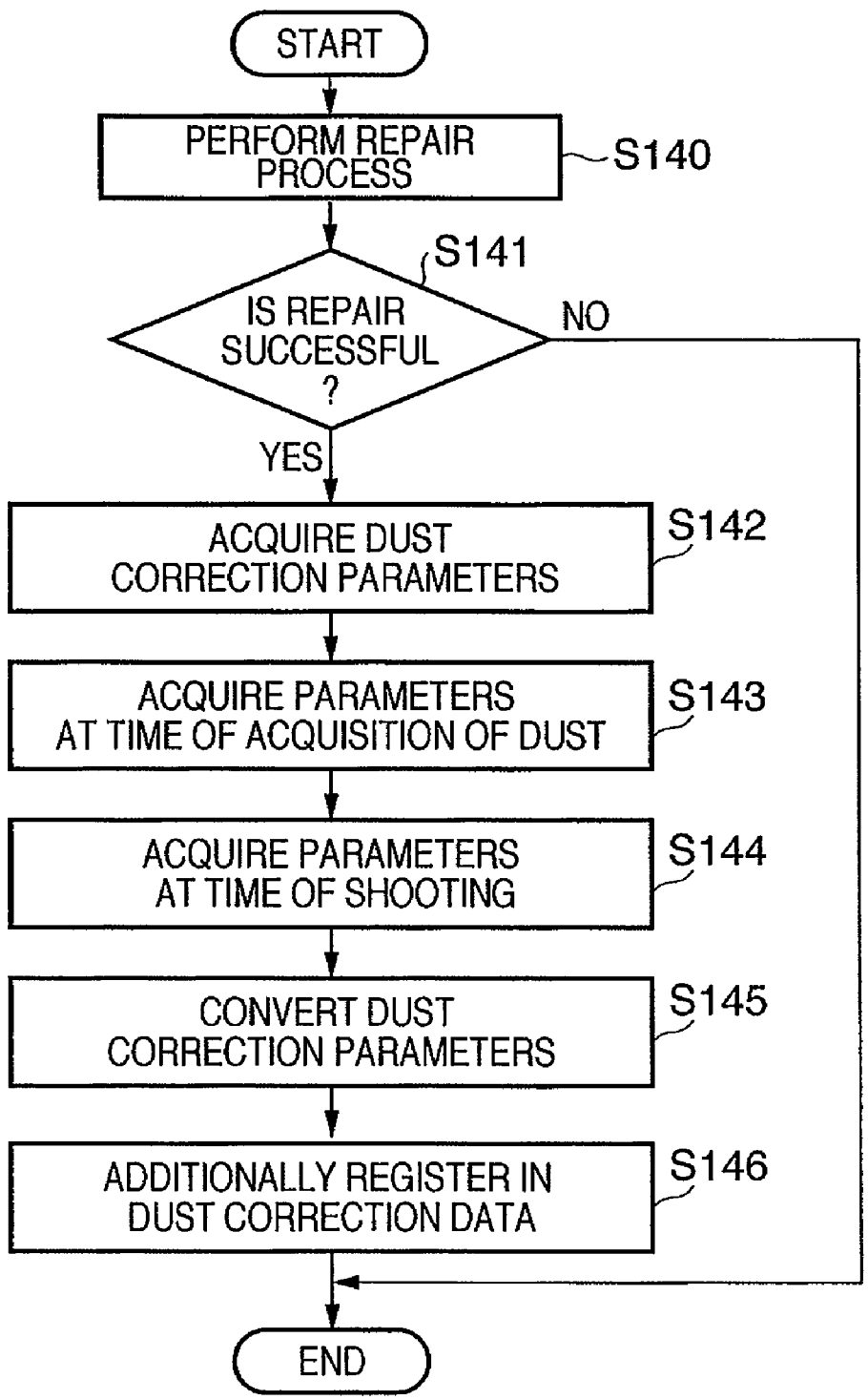
FIG. 17 is a flowchart showing additional registration processing for dust correction data in the first embodiment.

The processing from step S190 to step S195 is the same as that from step S140 to step S145 in the additional registration processing for dust correction data shown in FIG. 17 in the first embodiment, and hence a repetitive description will be omitted.

In step S196, the coordinates and radius of a dust area converted in step S195 are additionally registered at the end of an additional dust correction data table.

This embodiment performs an automatic repair process to be executed again, upon combining dust correction data associated with a shot image with the additional dust correction data table. Assume that an automatic repair process is to be performed for the first time. Even in this case, if an additional dust correction data table has been generated on the basis of another shot image, the process is performed after the dust correction data associated with the shot image is combined with the additional dust correction data table.

Figure 20:
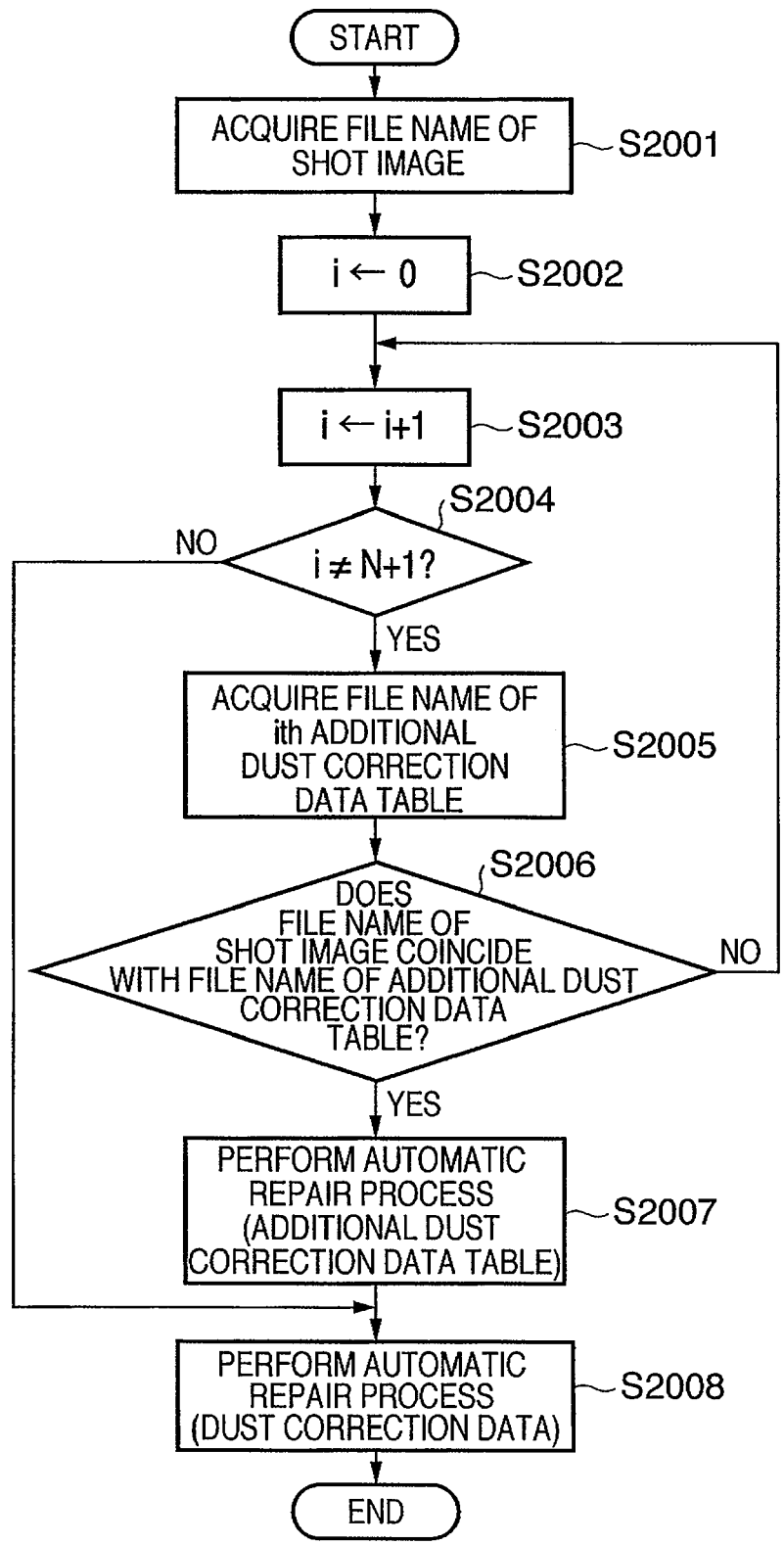
FIG. 20 is a flowchart showing an automatic repair process in the second embodiment.

FIG. 20 shows a flowchart for an automatic repair process in this embodiment.

In step S2001, the file name of a shot image is acquired.

In step S2002, i is initialized to 0.

In step S2003, i is incremented by 1.

In step S2004, it is determined whether i is not equal to N+1, where N represents the total number of additional dust correction data tables. If i is not equal to N+1, the process advances to step S2005. If i is equal to N+1, the process advances to step S2008.

In step S2005, the file name of the ith additional dust correction data table is acquired.

In step S2006, the file name of the shot image acquired in step S2001 is compared with the file name of the additional dust correction data table acquired in step S2005. Note that when the file names are to be compared, the extensions are removed. If the file names coincide with each other, the process advances to step S2007. If they do not coincide with each other, the process advances to step S2003.

In step S2007, an automatic repair process is performed by using the additional dust correction data table. In this case, the automatic repair process is performed in accordance with the flowchart shown in FIG. 12 in the first embodiment. In this case, however, the process is performed by using the additional dust correction data table instead of dust correction data.

In step S2008, the automatic repair process is performed by using the dust correction data. This processing is then terminated. In this case, the automatic repair process is performed in accordance with the flowchart shown in FIG. 12 in the first embodiment.

In this manner, dust which has not been registered in dust correction data can be additionally registered in the additional dust correction data table. With this operation, when, for example, an automatic repair process is performed again after all editing processes are canceled, an additional dust correction data table is used together with dust correction data. This makes it possible to automatically remove even dust which could not be removed initially.

Note that an additional dust correction data table is applied to another shot image file in the following manner. First of all, it is determined whether an image file to which the application of the table is examined has the same dust correction data as that of the edited image file. The image file name of an image file which is determined to have the same dust correction data is acquired. The file of the generated additional dust correction data table is then copied, and the file name is set as the image file name (extension is ".tbl"), thus generating an additional dust correction data table for the image file. Adding the file of an additional dust correction data table in this manner can apply the table to another shot image file.

Third Embodiment

In the second embodiment, dust correction data is linked with an additional dust correction data table by comparing file names. If, however, the file name of a shot image is changed, such a link may be broken. The third embodiment separately prepares a link table which associates a shot image with an additional dust correction data table, and associates dust correction data with the additional dust correction data table by using the link table.

FIG. 21 shows an example of the data format of a link table. The link table stores shooting dates, model IDs, and camera types as pieces of image information, and also stores additional dust correction data table IDs associated with these pieces of information. That is, an additional dust correction data table of this embodiment is obtained by storing IDs for identifying additional dust correction data tables in the head of the additional dust correction data table described in the second embodiment. These IDs need to be unique.

Figure 22:
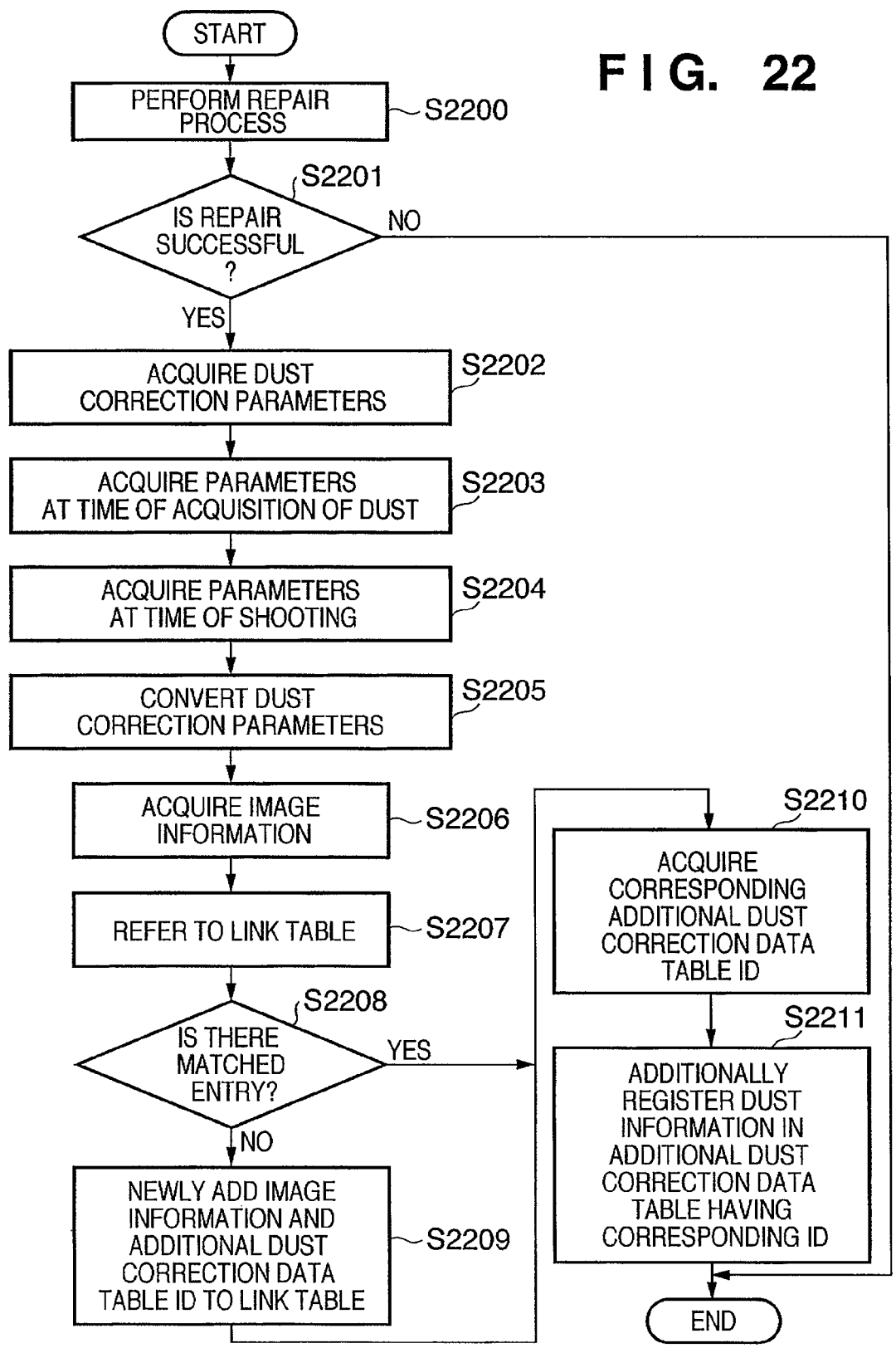
FIG. 22 is a flowchart showing unregistered dust additional registration processing in the third embodiment.

FIG. 22 is a flowchart showing the processing for additionally registering unregistered dust in an additional dust correction data table.

The processing from step S2200 to step S2205 is the same as that from step S140 to step S145 in the additional registration processing for dust correction data shown in FIG. 17 in the first embodiment, and hence a repetitive description will be omitted.

In step S2206, the image information of a shot image is acquired. In this case, the image information is the same as that in the link table shown in FIG. 21. In this embodiment, image information includes a shooting data, model ID, and camera type.

In step S2207, the link table shown in FIG. 21 is referred to by using the image information acquired in step S2206.

In step S2208, it is determined whether there is a matched entry in the link table. If there is a matched entry, the process advances to step S2210. If there is no matched entry, the process advances to step S2209.

In step S2209, the image information and the additional dust correction data table ID are newly added to the link table.

In step S2210, the corresponding additional dust correction data table ID is acquired from the link table.

In step S2211, dust information is additionally registered in the additional dust correction data table having the additional dust correction data table ID acquired in step S2210. This processing is then terminated.

This embodiment performs an automatic repair process upon combining dust correction data associated with a shot image with an additional dust correction data table associated with the shot image by a link table.

Figure 23:
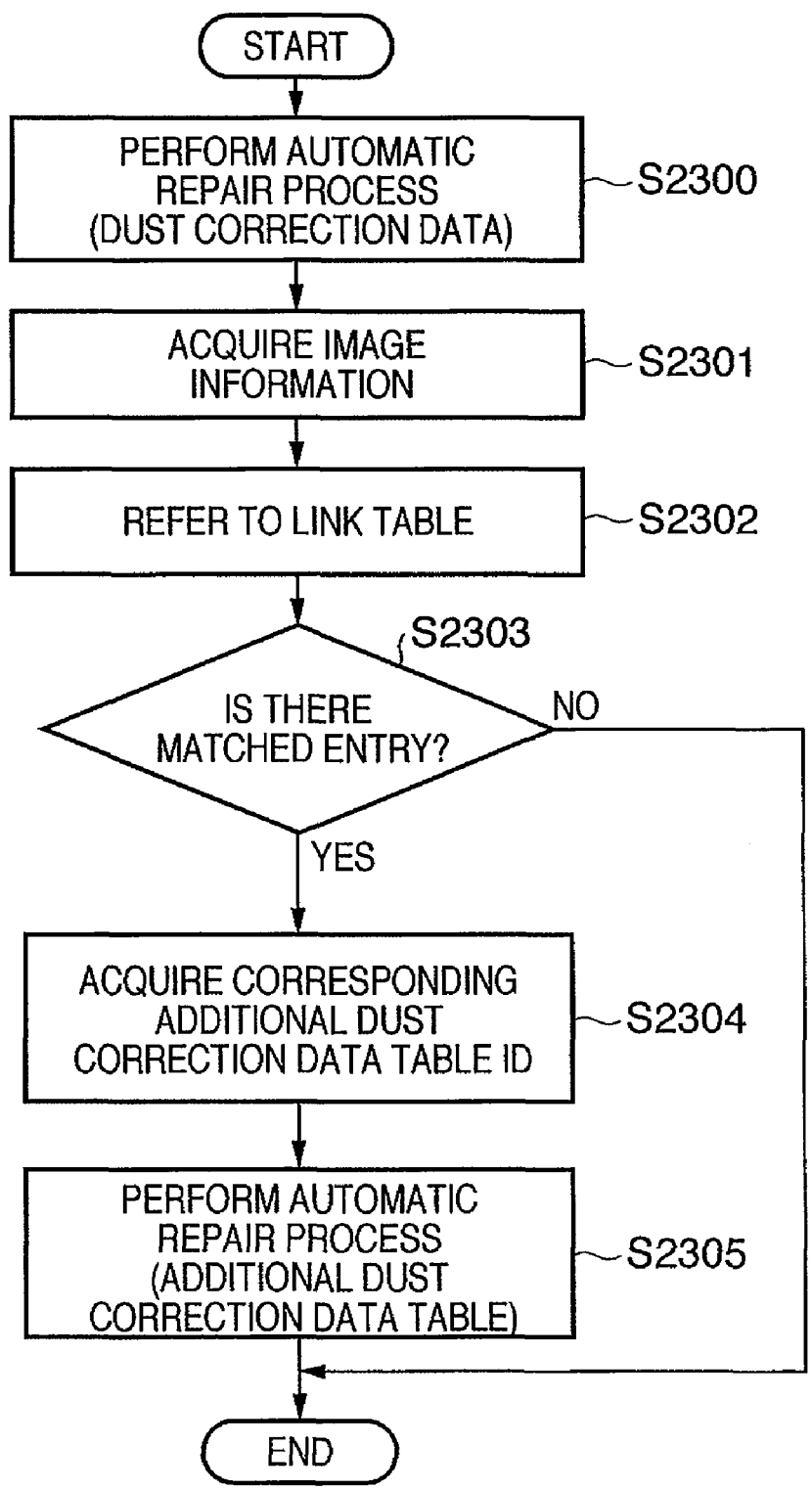
FIG. 23 is a flowchart showing an automatic repair process in the third embodiment.

FIG. 23 is a flowchart showing an automatic repair process in this embodiment.

In step S2300, an automatic repair process is performed by using dust correction data associated with a shot image.

In step S2301, the image information of the shot image is acquired. In this case, the image information is the same as that in the link table shown in FIG. 21. In this embodiment, image information includes a shooting date, model ID, and camera type.

In step S2302, the link table shown in FIG. 21 is referred to by using the image information acquired in step S2301.

In step S2303, it is determined whether there is a matched entry in the link table. If there is a matched entry, the process advances to step S2304. If there is no matched entry, the process advances to step S2304. This processing is then terminated.

In step S2304, the corresponding additional dust correction data table ID is acquired from the link table.

In step S2305, an automatic repair process is performed by using an additional dust correction data table having the additional dust correction data table ID acquired in step S2304. This processing is then terminated.

With this operation, dust which has not been registered in dust correction data can be additionally registered in an additional dust correction data table associated with a shot image. This makes it possible to refer to a proper additional dust correction data table even when the file name of a shot image is changed. In addition, since there is no need to prepare an additional dust correction data table for each shot image, the number of additional dust correction data tables can be reduced.

Fourth Embodiment

In the first embodiment, when a repair process is manually performed in the image editing program, the corresponding dust information is additionally registered in the dust correction data associated with the shot image. In contrast, the fourth embodiment is configured to additionally register dust information in dust correction data in a dust position memory 427 of the camera shown in FIG. 1 instead of dust correction data associated with a shot image. A known communication protocol can be used for communication between the image processing apparatus and the camera. Alternatively, it suffices to use a recording device 419 to rewrite dust correction data in the dust position memory 427 of the camera. This embodiment additionally registers dust information in dust correction data in the dust position memory 427 of the camera shown in FIG. 1 instead of dust correction data associated with a shot image. Obviously, the dust information can also be additionally registered in the dust correction data.

Allowing dust information to be additionally registered in dust correction data in the dust position memory 427 of the camera in this manner makes it possible to associate dust correction data containing the information of unregistered dust with the image data shot after additional registration.

Fifth Embodiment

The first or fourth embodiment has exemplified the processing of additionally registering new dust information in dust correction data when the user issues, for example, an instruction to execute a manual repair process on the image editing program. In contrast to this, the fifth embodiment performs the processing of additionally registering new dust information in dust correction data by using an LCD monitor device 417 and cross switch 116 of a camera instead of an image editing program.

Consider a case in which when displaying and checking a shot image on the LCD monitor device 417, the user presses a menu button 124 to select "add dust information with camera" from menu items. When the user selects "add dust information with camera", he/she can perform the processing of additionally registering new dust information in dust correction data by using the LCD monitor device 417 and the cross switch 116.

Figure 24:
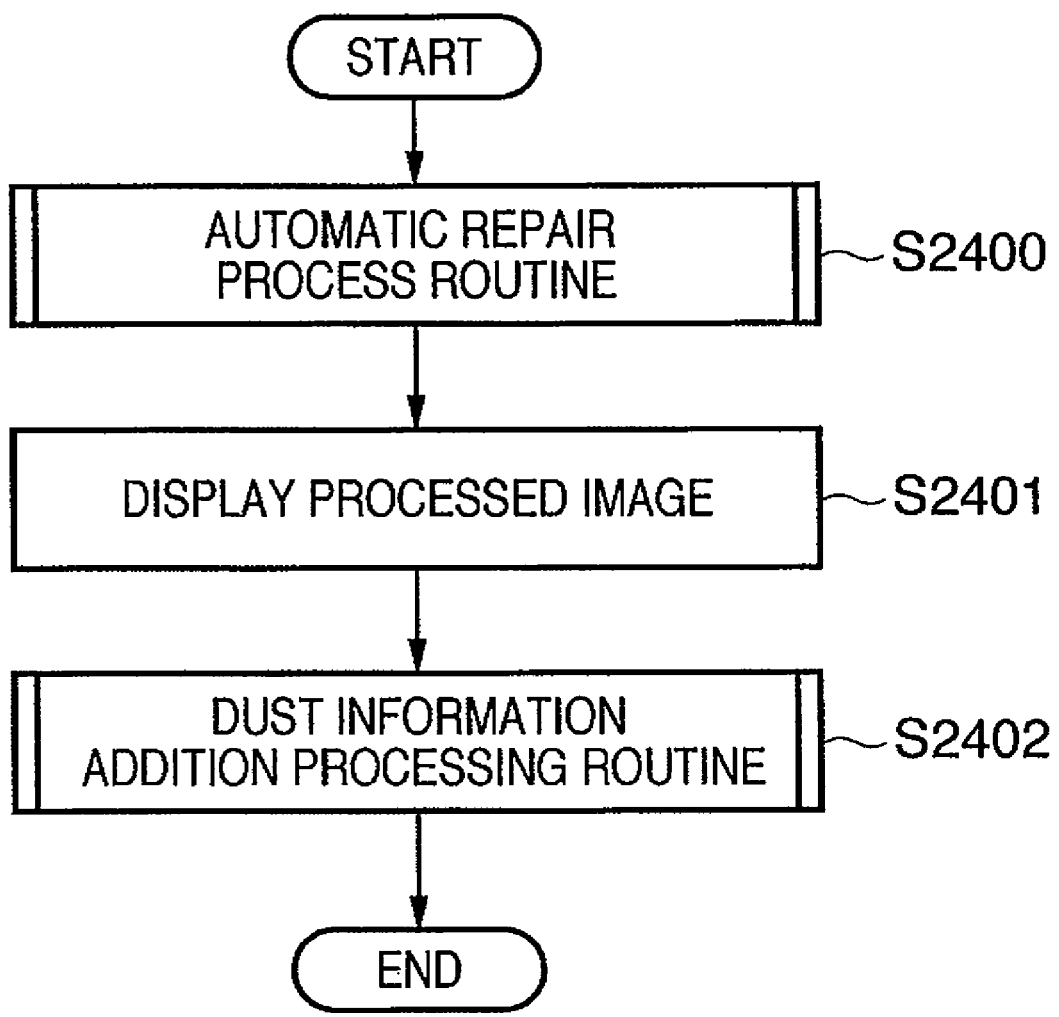
FIG. 24 is a flowchart showing unregistered dust additional registration processing performed by a camera according to the fifth embodiment.

The processing of adding unregistered dust by using the camera will be described with reference to the flowchart shown in FIG. 24.

In step S2400, the camera performs an automatic repair process. The details of this automatic repair process is the same as that performed when the automatic repair process execution button 1103 is pressed in the first embodiment, and hence a description will be omitted.

In step S2401, the camera displays an image after the automatic repair process on the LCD monitor device 417.

In step S2402, the camera performs the processing of additionally registering dust information in dust correction data. This dust information additional registration processing is the same as that in the first embodiment, and hence a detailed description thereof will be omitted. Note, however, that in this embodiment, the user designates the position and size of dust by using the LCD monitor device 417 and the cross switch 116 unlike in the first embodiment. That is, making a camera perform a process like a repair process will perform additional registration processing for dust correction data like that shown in FIG. 17 in the first embodiment.

The above embodiment has exemplified the method of additionally registering dust information in dust correction data associated with shot image data. Obviously, however, it also suffices to additionally register dust information in dust correction data in a dust position memory 427 of the camera. Alternatively, it is obvious that dust information can be additionally registered in both the above types of dust correction data. In this manner, operation on the camera can additionally register new dust information in dust correction data.

Other Embodiments

The object of each embodiment is also achieved by the following method. A storage medium (or recording medium) which records software program codes to implement the functions of the above embodiments is supplied to a system or apparatus. The computer (or CPU or MPU) of the system or apparatus reads out and executes the program codes stored in the storage medium. In this case, the program codes read out from the storage medium themselves implement the functions of the above embodiments. The store medium storing the program codes constitutes the present invention. The functions of the above embodiments are implemented not only when the readout program codes are executed by the computer but also when the operating system (OS) running on the computer performs part or all of actual processing on the basis of the instructions of the program codes.

The present invention also includes the following case. That is, the program codes read out from the storage medium are written in the memory of a function expansion board inserted into the computer or a function expansion unit connected to the computer. The CPU of the function expansion board or function expansion unit then performs part or all of actual processing on the basis of the instructions of the program codes, thereby implementing the above embodiments.

When the present invention is applied to the above storage medium, the storage medium stores program codes corresponding to the procedures described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-082743, filed Mar. 27, 2007, which is hereby incorporated by reference herein in its entirety.

What is claimed is:

1. An image processing apparatus which corrects a shot image, which is shot by an image capturing apparatus and on which a shadow of a foreign substance existing on a shooting optical path of the image capturing apparatus is captured, so as to reduce an influence of the shadow of the foreign substance, the apparatus comprising:

a display unit which displays the shot image;

a correction unit which corrects the shot image so as to reduce the influence of the shadow of the foreign substance on the basis of an original file which has foreign substance information which is information associated with the shot image and concerning at least a position and size of the foreign substance existing on the shooting optical path of the image capturing apparatus;

an input unit which is used by a user to input additional foreign substance information in accordance with the shot image displayed on said display unit; and an additional registration unit which additionally registers the additional foreign substance information input by said input unit in the foreign substance information when the additional foreign substance information is unregistered foreign substance information in the original file, wherein said additional registration unit registers the additional foreign substance information in an additional file which has information which indicates the type of the image capturing apparatus of which the captured image is to be corrected.

2. The apparatus according to claim 1, further comprising a determination unit which determines whether to additionally register the unregistered foreign substance information in each piece of the foreign substance information associated with each of a plurality of other images.

3. The apparatus according to claim 2, wherein said determination unit determines, on the basis of information which is attached to the shot image and specifies at least the image capturing apparatus which has shot the shot image, whether to additionally register the unregistered foreign substance information.

4. The apparatus according to claim 1, further comprising a registration determination unit which determines whether a foreign substance found in the shot image has already been registered in the foreign substance information.

5. An image capturing apparatus for use with the image processing apparatus defined in claim 1, the image capturing apparatus comprising:
    an acquisition unit which acquires the unregistered foreign substance information which is additionally registered by said additional registration unit of the image processing apparatus; and
    an updating unit which updates foreign substance information, which has already been stored in a storage unit, on the basis of the unregistered foreign substance information acquired by said acquisition unit.

6. An image capturing apparatus comprising:
    a display unit which displays a shot image;
    a correction unit which corrects the shot image so as to reduce an influence of the shadow of the foreign substance on the basis of an original file which has foreign substance information which is information associated with the shot image and concerning at least a position and size of the foreign substance existing on a shooting optical path;
    an input unit which is used by a user to input additional foreign substance information in accordance with the shot image displayed on said display unit; and
    an additional registration unit which additionally registers the additional foreign substance information input by said input unit in the foreign substance information when the additional foreign substance information is unregistered foreign substance information in the original file,
    wherein said additional registration unit registers the additional foreign substance information in an additional file which has information which indicates the type of the image capturing apparatus of which the captured image is to be corrected.

7. A method of controlling an image processing apparatus which corrects a shot image, which is shot by an image capturing apparatus and on which a shadow of a foreign substance existing on a shooting optical path of the image capturing apparatus is captured, so as to reduce an influence of the shadow of the foreign substance, the method comprising:
    a display step of displaying the shot image;
    a correction step of correcting the shot image so as to reduce the influence of the shadow of the foreign substance on the basis of an original file which has foreign substance information which is information associated with the shot image and concerning at least a position and size of the foreign substance existing on the shooting optical path of the image capturing apparatus; and
    an addition registration step of additionally registering, in the foreign substance information, unregistered foreign substance information which has been input by a user in accordance with the shot image displayed in the display step and has not been registered in the foreign substance information in the original file,
    wherein said additional registration step registers the additional foreign substance information in an additional file which has information which indicates the type of the image capturing apparatus of which the captured image is to be corrected.

8. A non-transitory computer-readable storage medium which stores a program for causing a computer to execute a control method defined in claim 7.

9. An image capturing apparatus comprising:
    an image sensing unit which captures an object image; and
    an image processing apparatus defined in claim 1.

* * * * *